US012526627B2

(12) United States Patent
Wu

(10) Patent No.: US 12,526,627 B2
(45) Date of Patent: Jan. 13, 2026

(54) AUTHENTICATION AND AUTHORIZATION METHOD AND APPARATUS

(71) Applicant: HUAWEI TECHNOLOGIES CO., LTD., GuangDong (CN)

(72) Inventor: Yizhuang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 200 days.

(21) Appl. No.: 17/990,981

(22) Filed: Nov. 21, 2022

(65) Prior Publication Data

US 2023/0087407 A1 Mar. 23, 2023

Related U.S. Application Data

(63) Continuation of application No. PCT/CN2021/094768, filed on May 20, 2021.

(30) Foreign Application Priority Data

May 22, 2020 (CN) .......................... 202010444207.3

(51) Int. Cl.
*H04W 12/065* (2021.01)
(52) U.S. Cl.
CPC ................. *H04W 12/065* (2021.01)
(58) Field of Classification Search
None
See application file for complete search history.

(56) References Cited

U.S. PATENT DOCUMENTS

| 2020/0059761 | A1* | 2/2020 | Li    | H04W 4/24  |
| 2020/0162919 | A1* | 5/2020 | Velev  | H04W 60/00 |
| 2020/0267554 | A1* | 8/2020 | Faccin | H04W 12/06 |

FOREIGN PATENT DOCUMENTS

| CN | 110999356 B   | 11/2022 |
| WO | 2018137873 A1 | 8/2018  |
| WO | 2020030537 A1 | 2/2020  |

OTHER PUBLICATIONS

Prasad et al. "3GPP 5G Security". May 3, 2018. (Year: 2018).*
5G; Security architecture and procedures for 5G System (3GPP TS 33.501 version 15.2.0 Release 15). Oct. 2018. (Year: 2018).*
5G; Procedures for the 5G System (3GPP TS 23.502 version 15.2.0 Release 15). Jun. 2018. (Year: 2018).*

(Continued)

*Primary Examiner* — Scott B Christensen
(74) *Attorney, Agent, or Firm* — Rimon PC

(57) ABSTRACT

A session management network element receives a session establishment request message from a terminal device, where the session establishment request message is used to request to establish a session with a data network. The session management network element determines whether an authentication result of authentication and/or authorization by the data network on the terminal device exists. When it is determined that the authentication result exists, the session management network element does not initiate a secondary authentication procedure for the session. In other words, the session management network element may decide, based on that the data network has authenticated the terminal device, to skip the secondary authentication procedure.

20 Claims, 13 Drawing Sheets

(56) References Cited

OTHER PUBLICATIONS

NEC, UE security capability for the Slice-Specific Secondary Authentication and Authorization. SA WG2 Meeting #129, Oct. 15-19, 2018, Dongguan, P.R. China, S2-1810110, 7 pages.

3GPP TS 23.501 V16.4.0 (Mar. 2020), 3rd Generation Partnership Project; Technical Specification Group Services and System Aspects; System architecture for the 5G System (5GS); Stage 2 (Release 16), 430 pages.

Nokia, Comments on contribution S3-161789 that proposes secondary authentication in the slice as the only means of authenticating UE's access to a network slice. 3GPP TSG SA WG3 (Security) Meeting #85, Nov. 7-11, 2016, Santa Cruz de Tenerife (Spain), S3-161961, 6 pages.

Huawei, HiSilicon, TS 23.502: AF influenced PDU session establishment and DN authentication/authorization via NEF, 3GPP TSG SA WG2 Meeting #123, Oct. 23-Oct. 27, 2017, Ljubljana, Slovenia, S2-177384, 12 pages.

Huawei, Clarification for Secondary Authentication. 3GPP TSG-SA WG3 Meeting #96 Wroclaw (Poland), Aug. 26-30, 2019, S3-192993, 4 pages.

* cited by examiner

AUTHENTICATION AND AUTHORIZATION METHOD AND APPARATUS

CROSS-REFERENCE TO RELATED APPLICATIONS

This application is a continuation of International Application No. PCT/CN2021/094768, filed on May 20, 2021, which claims priority to Chinese Patent Application No. 202010444207.3, filed on May 22, 2020. The disclosures of the aforementioned applications are hereby incorporated by reference in their entireties.

TECHNICAL FIELD

This disclosure relates to the communication field, and more specifically, to an authentication and authorization method and apparatus.

BACKGROUND

In terms of network security, a primary task of a network is to authenticate and authorize terminal devices that access the network. Currently, a common authentication manner includes secondary authentication. After a terminal device accesses an operator network, and first-level authentication between the terminal device and the operator network succeeds, if the terminal device needs to access a data network (DN), the terminal device establishes a protocol data unit (PDU) session with the operator network. In a process in which the terminal device establishes the PDU session with the operator network, second-level authentication is performed between the terminal device and an authentication network element corresponding to the DN.

In actual communication, for a same DN, in some scenarios, one terminal device may establish two or more PDU sessions. For secondary authentication in the scenario of a plurality of PDU sessions, a common solution is to determine whether DN identifiers (DNNs) of two PDU sessions are the same, to determine whether to perform secondary authentication.

Specifically, the terminal device initiates a first PDU session establishment request, and stores authentication information after performing secondary authentication. The authentication information includes a DNN. When the terminal device initiates a second PDU session establishment request, if a DNN in the second PDU session establishment request is the same as the DNN in the stored authentication information of a first PDU session, the terminal device determines not to perform a secondary authentication procedure; or if a DNN in the second PDU session establishment request is different from the DNN in the stored authentication information of a first PDU session, the terminal device determines to perform a secondary authentication procedure.

This way of determining, depending on whether the DNNs of the two PDU sessions are the same, whether to perform the secondary authentication procedure applies to limited scenarios, because the secondary authentication procedure may be performed for a plurality of times for the plurality of PDU sessions that access the same DN, causing additional signaling overheads.

SUMMARY

This disclosure provides an authentication and authorization method and apparatus, so that this disclosure is applicable to more scenarios, signaling overheads caused by repeatedly performing secondary authentication are reduced, and this solution is simple and easy to implement.

According to a first aspect, an authentication and authorization method is provided. The method may be performed by a session management network element, or may be performed by a chip, a chip system, or a circuit configured in a session management network element. This is not limited in this disclosure.

The method may include: receiving a session establishment request message from a terminal device, where the session establishment request message is used to request to establish a session with a data network; determining whether an authentication result of authentication and/or authorization by the data network on the terminal device exists; and when the authentication result exists, skipping a secondary authentication procedure for the session.

In an example, the authentication result indicates that authentication succeeds. To be specific, the data network has authenticated the terminal device, and authentication and authorization succeed. In this example, the secondary authentication procedure is skipped for the session. To be specific, the secondary authentication procedure may be skipped, and the session is established by using authentication and authorization information (namely, the authentication and authorization information indicating that the authentication succeeds).

In another example, the authentication result indicates that authentication fails. To be specific, the data network has authenticated the terminal device, and authentication and authorization fail. In this example, the secondary authentication procedure is skipped for the session. In this case, establishment of the session may be rejected. Alternatively, whether to reject establishment of the session may be determined based on a failure reason.

Based on the foregoing technical solution, during session establishment, the session management network element may determine, depending on whether the data network (or an authentication network element of the data network) has authenticated the terminal device, whether to initiate the secondary authentication procedure. That is, an authentication and authorization procedure is used by the data network to authenticate and authorize whether the terminal device can establish the session to access the data network. For example, when the authentication result exists, the secondary authentication procedure is skipped for the session. Therefore, more scenarios are applicable. For example, in a scenario in which it can be ensured that different data network identifiers (DNNs) are used to access the data network, the secondary authentication procedure can also be prevented from being repeatedly performed. According to embodiments of this disclosure, it can be ensured that even if different DNNs are used to access the data network, the session management network element can also prevent the secondary authentication procedure as much as possible from being repeatedly performed.

With reference to the first aspect, in some implementations of the first aspect, the authentication result includes authentication and authorization information, where the authentication and authorization information includes one or more of the following: one or more data network identifiers, an identifier of an authentication network element of the data network, validity information, an index of a text authorized by the data network, a session-aggregate maximum bit rate authorized by the data network, an allowed media access control address, an allowed virtual local area network identifier, and information indicating to report session information.

With reference to the first aspect, in some implementations of the first aspect, the method further includes: initiating the secondary authentication procedure for the session, or suspending the session when no authentication result exists.

For example, suspending the session, or stopping establishing the session, indicates temporarily stopping establishing the session, temporarily stopping the secondary authentication procedure for the session, or waiting for an authentication result for another session.

For example, when it is determined to suspend the session, a secondary authentication result may be requested from or subscribed to the unified data management network element.

In a scenario, the terminal device includes indication information in the session establishment request message, indicating that the session is a redundant session. In this scenario, based on this indication, secondary authentication may be directly skipped, or the session is suspended, and the authentication result for the another session is reused.

In another scenario, the terminal device simultaneously initiates two sessions, and the session establishment request message includes indication information. The indication information indicates to suspend the session, or indicates the data network to be to perform secondary authentication for the another session. In this scenario, based on the indication information, the secondary authentication procedure may alternatively be skipped or the session is suspended.

Based on the foregoing technical solution, a scenario in which a plurality of sessions are simultaneously established, or a scenario in which secondary authentication is being performed between the data network and the terminal device when the session establishment request is initiated is applicable. Therefore, the secondary authentication procedure can be further prevented from being repeatedly performed.

With reference to the first aspect, in some implementations of the first aspect, after the initiating the secondary authentication procedure for the session, the method further includes: suspending the session based on first indication information sent by the terminal device or an authentication network element of the data network, where the first indication information indicates the data network to perform secondary authentication for the another session of the terminal device.

For example, the first indication information may alternatively indicate to suspend the session. It should be understood that the content indicated by the first indication information may not be limited, and any manner in which the session management network element suspends the session based on this indication of the terminal device or the authentication network element of the data network falls within the protection scope of this embodiment of this disclosure.

Based on the foregoing technical solution, when it is determined that no authentication result exists, the secondary authentication procedure may be initiated. In a process of performing the secondary authentication procedure, if determining that the current data network and/or the terminal device are/is performing secondary authentication (to be specific, performing secondary authentication for the another session), the terminal device or the data network (or the authentication network element of the data network) may send a suspend indication (namely, the first indication information), so that the session management network element may suspend the session based on the indication information, in other others, temporarily stop establishing the session. Therefore, the terminal device or the data network (or the authentication network element of the data network) may indicate that the secondary authentication is being performed, so that signaling overheads caused by repeatedly performing the secondary authentication procedure are avoided.

With reference to the first aspect, in some implementations of the first aspect, the method further includes: when no authentication result exists, determining whether the data network is to perform secondary authentication for another session of the terminal device; and when the data network is determined to perform secondary authentication for the another session of the terminal device, suspending the session; or when the data network does not perform secondary authentication for the another session of the terminal device, initiating the secondary authentication procedure for the session.

Based on the foregoing technical solution, after determining that no authentication result exists, the session management network element may determine whether the data network is performing secondary authentication.

With reference to the first aspect, in some implementations of the first aspect, after the suspending the session, the method further includes: obtaining an authentication result of authentication and/or authorization by the data network for the another session of the terminal device, where the authentication result for the another session indicates that secondary authentication for the another session succeeds or fails.

The authentication result for the another session indicates that the secondary authentication for the another session succeeds or fails.

For example, the authentication result of authentication and/or authorization by the data network for the another session of the terminal device is stored.

For example, the authentication result of authentication and/or authorization by the data network for the another session of the terminal device is obtained from any one of the following: an authentication network element of the data network, the terminal device, a unified data management network element, or a local.

With reference to the first aspect, in some implementations of the first aspect, when the authentication result for the another session indicates that the secondary authentication for the another session succeeds, the secondary authentication procedure for the session is skipped, and a subsequent session establishment procedure is continued; or when the authentication result for the another session indicates that the secondary authentication for the another session fails, establishment of the session is rejected.

For example, when the authentication result for the another session indicates that the secondary authentication for the another session fails, the session management network element may alternatively determine, based on a failure reason, whether to reject establishment of the session and/or whether to store the authentication result.

Based on the foregoing technical solution, the secondary authentication procedure may be skipped, and the terminal device or the data network (or the authentication network element of the data network) directly sends an authentication and authorization result to the session management network element, so that signaling overheads caused by repeatedly performing the secondary authentication procedure are avoided.

With reference to the first aspect, in some implementations of the first aspect, when the secondary authentication procedure for the session is initiated, the method further includes: after secondary authentication for the session succeeds, determining, based on any one of the following: a session attribute of the session, a local policy, or second indication information, whether to store an authentication result for the session, where the second indication information is information that is from an authentication network element of the data network or from the terminal device and that indicates whether to store the authentication result for the session.

With reference to the first aspect, in some implementations of the first aspect, the determining whether an authentication result of authentication and/or authorization by the data network on the terminal device exists includes: determining whether the authentication result locally exists; determining whether the authentication result exists in a unified data management network element; determining, based on third indication information from the terminal device or from the authentication network element of the data network, whether the authentication result exists; or determining whether the authentication result exists in an authenticated dataset.

For example, the authenticated dataset may be locally obtained, or may be obtained from the unified data management network element.

For example, the authenticated dataset indicates that authentication results have been authenticated, where the authentication results may include an authentication result that is successfully authenticated and/or an authentication result that fails to be authenticated. For example, whether there is information indicating that the data network has authenticated the terminal device may be checked from the successfully authenticated result. If there is the information indicating that the data network has authenticated the terminal device, it indicates that the data network has authenticated the terminal device, and the authentication result indicates that the authentication succeeds. For another example, whether there is information indicating that the data network has authenticated the terminal device may be checked from the unsuccessfully authenticated result. If there is the information indicating that the data network has authenticated the terminal device, it indicates that the data network has authenticated the terminal device, and the authentication result indicates that the authentication fails.

In an example, the third indication information is from the terminal device, and the third indication information may be embodied as a session identifier. This example is applicable to an ultra-reliable low-latency communication scenario.

For example, when establishing the session (for example, denoted as a session #1), the terminal device also includes a session identifier (for example, a session ID) of another session (for example, denoted as a session #2). In this indication manner, the session #1 and the session #2 are redundant for each other, that is, are connected to the same data network. For the session #1, the session management network element may further determine that secondary authentication does not need to be initiated, or reuse an authentication and authorization result for the another session #2.

In another example, the third indication information is from the terminal device, and the third indication information may be embodied as a DNN. This example is applicable to an ultra-reliable low-latency communication scenario.

For example, when establishing the session (for example, denoted as a session #1), the terminal device also includes a DNN of another session (for example, denoted as a session #2). In this indication manner, the session #1 is a session that corresponds to the same data network and that uses a DNN different from a previous DNN. For the session #1, the session management network element may further determine that secondary authentication does not need to be initiated, or reuse an authentication and authorization result for the another session #2.

With reference to the first aspect, in some implementations of the first aspect, the determining whether the authentication result exists in an authenticated dataset includes: when the authenticated dataset includes an identifier of the data network, determining that the authentication result exists; or when the authenticated dataset does not include an identifier of the data network, determining that no authentication result exists.

According to a second aspect, an authentication and authorization method is provided. The method may be performed by a session management network element, or may be performed by a chip, a chip system, or a circuit configured in a session management network element. This is not limited in this disclosure.

The method may include: receiving a session establishment request message from a terminal device, where the session establishment request message is used to request to establish a session with a data network; determining whether the data network is to perform secondary authentication for another session of the terminal device; and when the data network is determined to perform secondary authentication for the another session of the terminal device, suspending the session.

Based on the foregoing technical solution, during session establishment, the session management network element may determine, depending on whether the data network (or an authentication network element of the data network) is authenticating the terminal device (to be specific, is authenticating the other session of the terminal device), whether to suspend the session. For example, when performing secondary authentication for the other session of the terminal device, the data network may suspend the session, wait for an authentication result for the another session, and determine, based on the authentication result for the other session, whether to initiate secondary authentication or determine whether to establish the session. Therefore, more scenarios are applicable. For example, it can be ensured that in a scenario in which secondary authentication is being performed for the other session when the session establishment request is initiated, the secondary authentication procedure can also be prevented from being repeatedly performed. According to embodiments of this disclosure, the secondary authentication procedure can be prevented as much as possible from being repeatedly performed.

With reference to the second aspect, in some implementations of the second aspect, when the data network is determined to perform secondary authentication for the another session of the terminal device, the suspending the session includes: suspending the session based on first indication information carried in the session establishment request message, where the first indication information indicates the data network to perform secondary authentication for the another session of the terminal device.

With reference to the second aspect, in some implementations of the second aspect, after the suspending the session, the method further includes: obtaining an authentication result of authentication and/or authorization by the data network for the another session of the terminal device, where the authentication result for the another session indicates that secondary authentication for the another session succeeds or fails.

For example, the authentication result of authentication and/or authorization by the data network for the another session of the terminal device is obtained from any one of the following: an authentication network element of the data network, the terminal device, a unified data management network element, or a local.

With reference to the second aspect, in some implementations of the second aspect, the method further includes: when the authentication result for the another session indicates that the secondary authentication for the another session succeeds, skipping the secondary authentication procedure for the session, and continuing a subsequent session establishment procedure; or when the authentication result for the another session indicates that the secondary authentication for the another session fails, rejecting establishment of the session.

Based on the foregoing technical solution, after it is determined whether secondary authentication is being performed, it may be further determined whether the authentication result exists, in other words, it is determined whether the data network has authenticated the terminal device, so that repeated authentication can be prevented.

With reference to the second aspect, in some implementations of the second aspect, the method further includes: when the data network does not perform secondary authentication for the another session of the terminal device, determining whether an authentication result of authentication and/or authorization by the data network on the terminal device exists; and when the authentication result exists, skipping a secondary authentication procedure for the session; or when no authentication result exists, initiating a secondary authentication procedure for the session.

With reference to the second aspect, in some implementations of the second aspect, when the secondary authentication procedure for the session is initiated, the method further includes: after secondary authentication for the session succeeds, determining, based on any one of the following: a session attribute of the session, a local policy, or second indication information, whether to store an authentication result for the session, where the second indication information is information that is from an authentication network element of the data network or from the terminal device and that indicates whether to store the authentication result for the session.

With reference to the second aspect, in some implementations of the second aspect, the determining whether an authentication result of authentication and/or authorization by the data network on the terminal device exists includes: determining whether the authentication result locally exists; determining whether the authentication result exists in a unified data management network element; determining, based on third indication information from the terminal device or from the authentication network element of the data network, whether the authentication result exists; or determining whether the authentication result exists in an authenticated dataset.

With reference to the second aspect, in some implementations of the second aspect, the authenticated dataset includes a successfully authenticated database; and the determining whether the authentication result exists in an authenticated dataset includes: when the successfully authenticated dataset includes an identifier of the data network, determining that the authentication result exists; or when the successfully authenticated dataset does not include an identifier of the data network, determining that no authentication result exists.

According to a third aspect, an authentication and authorization method is provided. The method may be performed by a terminal device, or may be performed by a chip, a chip system, or a circuit configured in a terminal device. This is not limited in this disclosure.

The method may include: determining whether an authentication result of authentication and/or authorization by a data network on the terminal device exists; and sending a session establishment request message and first indication information to a session management network element, where the session establishment request message is used to request to establish a session with the data network, and the first indication information indicates that the authentication result of authentication and/or authorization by the data network on the terminal device exists.

According to a fourth aspect, an authentication and authorization method is provided. The method may be performed by a terminal device, or may be performed by a chip, a chip system, or a circuit configured in a terminal device. This is not limited in this disclosure.

The method may include: determining that a data network is to perform secondary authentication for another session of the terminal device; and sending a session establishment request message and first indication information to a session management network element, where the session establishment request message is used to request to establish a session with the data network, and the first indication information indicates the data network to perform secondary authentication for the another session of the terminal device.

According to a fifth aspect, an authentication and authorization method is provided. The method may be performed by a terminal device, or may be performed by a chip, a chip system, or a circuit configured in a terminal device. This is not limited in this disclosure.

The method may include: sending a session establishment request message to a session management network element, where the session establishment request message is used to request to establish a session with a data network; determining, in a process of performing secondary authentication for the session with the data network, whether the data network is to perform secondary authentication for another session of the terminal device; and when the data network is determined to perform secondary authentication for the another session of the terminal device, sending first indication information to the session management network element, where the first indication information indicates the data network to perform secondary authentication for the another session of the terminal device.

Based on the foregoing technical solution, during session establishment (for example, in a process of performing secondary authentication for the session), the terminal device may determine, depending on whether the data network (or the authentication network element of the data network) is authenticating the terminal device (to be specific, is authenticating the other session of the terminal device), whether to send a suspend indication to the session management network element. For example, when performing secondary authentication for the other session of the terminal device, the data network may send the suspend indication, wait for an authentication result for the another session, and determine, based on the authentication result for the other session, whether to initiate secondary authentication or determine whether to establish the session. Therefore, more scenarios are applicable. For example, it can be ensured that in a scenario in which secondary authentication is being performed for the other session when the session establishment request is initiated, the secondary authentication procedure can also be prevented from being repeatedly performed. According to embodiments of this disclosure, the secondary authentication procedure can be prevented as much as possible from being repeatedly performed.

With reference to the third aspect, the fourth aspect, or the fifth aspect, in some implementations, the determining, in a process of performing secondary authentication for the session with the data network, whether the data network is to perform secondary authentication for another session of the terminal device includes: after an authentication protocol request message from the session management network element is received, determining whether the data network is to perform secondary authentication for the another session of the terminal device.

With reference to the third aspect, the fourth aspect, or the fifth aspect, in some implementations, the method further includes: after secondary authentication performed by the data network for the another session of the terminal device ends, sending an authentication result for the another session to the session management network element, where the authentication result for the another session indicates that the secondary authentication for the another session succeeds or fails.

With reference to the third aspect, the fourth aspect, or the fifth aspect, in some implementations, the method further includes: determining, based on stored information and one or more session attributes of the session, to send the authentication result for the another session to the session management network element after secondary authentication performed by the data network for the another session of the terminal device ends, where the stored information indicates to send the authentication result for the another session to the session management network element after secondary authentication performed by the data network for the another session of the terminal device ends.

With reference to the third aspect, the fourth aspect, or the fifth aspect, in some implementations, the method further includes: sending second indication information to the session management network element, where the second indication information indicates whether to store information about the authentication result of authentication and/or authorization by the data network on the terminal device.

According to a sixth aspect, an authentication and authorization method is provided. The method may be performed by an authentication network element of a data network, or may be performed by a chip, a chip system, or a circuit configured in an authentication network element of a data network. This is not limited in this disclosure.

The method may include: receiving an authentication and authorization message from a session management network element, where the authentication and authorization message is used by a data network to verify whether a terminal device is authorized to establish a session for accessing the data network; determining whether an authentication result of authentication and/or authorization by the data network on the terminal device exists, or determining that the data network is to perform secondary authentication for another session of the terminal device; and sending first indication information to the session management network element, where the first indication information indicates whether the authentication result of authentication and/or authorization by the data network on the terminal device exists, or the first indication information indicates the data network to perform secondary authentication for the another session of the terminal device.

Based on the foregoing technical solution, during session establishment, the data network (or the authentication network element of the data network) determines whether a secondary authentication procedure is being performed, so that the secondary authentication procedure is skipped, and an authentication and authorization result is directly sent to the session management network element. Therefore, the data network (or the authentication network element of the data network), as a centralized control point, may determine to reuse the secondary authentication result, so that signaling overheads caused by repeatedly performing the secondary authentication procedure are avoided.

With reference to the sixth aspect, in some implementations of the sixth aspect, when it is determined that the data network is to perform secondary authentication for the another session of the terminal device, the method further includes: after secondary authentication performed by the data network for the another session of the terminal device ends, sending an authentication result for the another session to the session management network element, where the authentication result for the another session indicates that the secondary authentication for the another session succeeds or fails.

With reference to the sixth aspect, in some implementations of the sixth aspect, the method further includes: determining, based on stored information and one or more session attributes of the session, to send the authentication result for the another session to the session management network element after the secondary authentication by the data network for the another session of the terminal device ends, where the stored information indicates to send the authentication result for the another session to the session management network element after secondary authentication performed by the data network for the another session of the terminal device ends.

With reference to the sixth aspect, in some implementations of the sixth aspect, the method further includes: sending second indication information to the session management network element, where the second indication information indicates whether to store information about the authentication result of authentication and/or authorization by the data network on the terminal device.

According to a seventh aspect, an authentication and authorization method is provided. The method may be performed by a session management network element and a unified data management network element, or may be performed by a chip, a chip system, or a circuit configured in a session management network element and a unified data management network element. This is not limited in this disclosure.

The method may include: receiving, by the session management network element, a session establishment request message from a terminal device, where the session establishment request message is used to request to establish a session with a data network; sending, by the session management network element, a request message to the unified data management network element, where the request message is used to request an authentication result of the terminal device; sending, by the unified data management network element, the authentication result of the terminal device to the session management network element; and when the authentication result of authentication and/or authorization by the data network on the terminal device exists, skipping a secondary authentication procedure for the session.

According to an eighth aspect, an authentication and authorization apparatus is provided, where the apparatus is configured to perform the methods provided in the first aspect to the seventh aspect. Specifically, the apparatus may include modules configured to perform the methods provided in the first aspect to the seventh aspect.

According to a ninth aspect, an authentication and authorization apparatus is provided, including a processor. The processor is coupled to a memory, and may be configured to execute instructions in the memory, to implement the method in any one of the first aspect to the seventh aspect and the possible implementations of the first aspect to the seventh aspect. Optionally, the apparatus further includes the memory. Optionally, the apparatus further includes a communication interface, the processor is coupled to the communication interface, and the communication interface is configured to input and/or output information. The information includes at least one of the instructions and data.

In an implementation, the apparatus is a device, for example, a session management network element, an authentication network element of a data network, or a terminal device. When the apparatus is the device, the communication interface may be a transceiver or an input/output interface.

In another implementation, the apparatus is a chip or a chip system. When the apparatus is the chip or the chip system, the communication interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In another implementation, the apparatus is a chip or a chip system configured in a device, for example, a session management network element, an authentication network element of a data network, or a terminal device.

Optionally, the transceiver may be a transceiver circuit. Optionally, the input/output interface may be an input/output circuit.

According to a tenth aspect, a computer-readable storage medium is provided. The computer-readable storage medium stores a computer program. When the computer program is executed by an apparatus, the apparatus is enabled to implement the method in any one of the first aspect to the seventh aspect or the possible implementations of the first aspect to the seventh aspect.

According to an eleventh aspect, a computer program product including instructions is provided. When the instructions are executed by a computer, an apparatus is enabled to implement the method provided in the first aspect to the seventh aspect.

According to a twelfth aspect, a communication system is provided, including the session management network element, the terminal device, and the authentication network element of the data network that are described above, or including the session management network element, the terminal device, the authentication network element of the data network, and the unified data management network element that are described above.

DESCRIPTION OF EMBODIMENTS

The following describes technical solutions of this disclosure with reference to the accompanying drawings.

The technical solutions provided in this disclosure may be applied to various communication systems, for example, a 5th generation (5G) mobile communication system or a new radio access technology (new radio access technology, NR). The 5G mobile communication system may include a non-standalone (NSA) communication system and/or a standalone (SA) communication system.

The technical solutions provided in this disclosure may be applied to any scenario in which a terminal device establishes a plurality of protocol data unit (protocol data unit, PDU) sessions.

The technical solutions provided in this disclosure may also be applied to a machine type communication (MTC) network, a long term evolution machine type communication (LTE-M) network, a device-to-device (D2D) network, a machine-to-machine (M2M) network, an internet of things (internet of things, IoT) network, or another network. The IoT network may include, for example, an internet of vehicles. Communication manners in an internet of vehicles system are collectively referred to as vehicle to another device (vehicle to X, V2X, where X may represent anything). For example, the V2X may include vehicle to vehicle (V2V) communication, vehicle to infrastructure (V2I) communication, vehicle to pedestrian (V2P) communication, vehicle to network (V2N) communication, or the like.

For ease of understanding embodiments of this disclosure, a network architecture applicable to embodiments of this disclosure is first described in detail with reference to FIG. 1.

Figure 1:
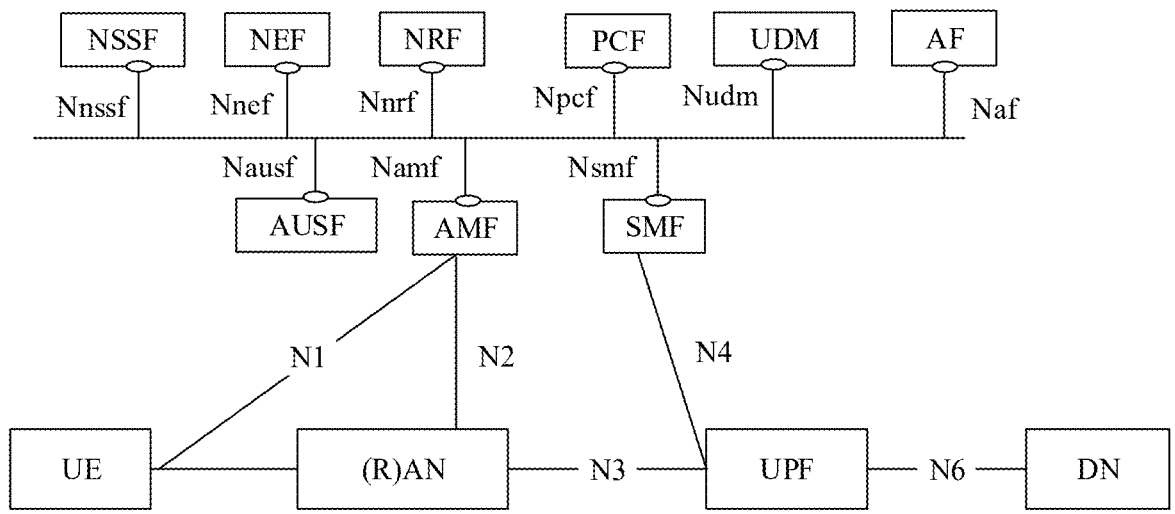
FIG. 1 is a schematic diagram of a network architecture applicable to an embodiment of this disclosure.

FIG. 1 is a schematic diagram of a network architecture applicable to an embodiment of this disclosure. As shown in FIG. 1, the network architecture is, for example, a 5G system (5GS) defined in the 3rd generation partnership project (3GPP) protocol. The network architecture may be divided into two parts: an access network (AN) and a core network (CN). The access network may be configured to implement a radio access-related function. The access network may include a 3GPP access network (or a 3GPP access technology) and a non-3rd generation partnership project (non-3GPP) access network (or a non-3GPP access technology). The core network mainly includes the following several key logical network elements: an access and mobility management function (AMF) network element, a session management function (SMF) network element, a user plane function (user plane function, UPF) network element, a policy control function (PCF) network element, a unified data management (UDM) network element, and the like.

The following briefly describes network elements shown in FIG. 1. 1. A user equipment (UE) may be referred to as a terminal device, an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data connectivity for a user, for example, a handheld device or a vehicle-mounted device having a wireless connection function. Currently, some examples of the terminal may be: a mobile phone, a tablet computer (pad), a computer having a wireless sending/receiving function (for example, a notebook computer or a palmtop computer), a mobile internet device (MID), a virtual reality (VR) device, an augmented reality (AR) device, a wireless terminal in industrial control, a wireless terminal in self-driving, a wireless terminal in remote, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or computing device having a wireless communication function, another processing device connected to a wireless modem, a vehicle-mounted device, a wearable device, a terminal device in a 5G network, a terminal device in a future evolved public land mobile network (PLMN), and the like.

In addition, the terminal device may alternatively be a terminal device in an internet of things (IoT) system. An IoT is an important part in future development of information technologies. A main technical feature of the IoT is to connect things to a network by using a communication technology, to implement an intelligent network for human-machine interconnection and thing-thing interconnection. The IoT technology can implement massive connections, deep coverage, and power saving for terminals by using, for example, a narrowband NB technology.

In addition, the terminal device may alternatively include sensors such as an intelligent printer, a train detector, and a gas station, and main functions include: collecting data (which is a function of some terminal devices), receiving control information and downlink data of a network device, sending an electromagnetic wave, and transmitting uplink data to the network device.

It should be understood that the terminal device may be any device that may access the network. The terminal device may communicate with the access network device by using an air interface technology.

2. An access network (AN) may provide a network access function for authorized users in a specific area, and includes a radio access network (RAN) device and an AN device. The RAN device is mainly a wireless network device in a 3GPP network, and the AN device may be an access network device defined in a non-3GPP.

Different access networks may use different access technologies. Currently, there are two types of radio access technologies: a 3GPP access technology (for example, a radio access technology used in a 3G, 4G, or 5G system) and a non-3GPP (non-3GPP) access technology. The 3GPP access technology is an access technology that complies with a 3GPP standard specification. For example, an access network device in the 5G system is referred to as a next generation node base station (gNB) or a RAN. The non-3GPP access technology is an access technology that does not comply with the 3GPP standard specification, for example, an air interface technology represented by an access point (AP) in wireless fidelity (wireless fidelity, Wi-Fi), a worldwide interoperability for microwave access (WiMAX) network, or a code division multiple access (CDMA) network. The access network device (AN device) may allow the terminal device and the 3GPP core network to perform interconnection and interworking by using the non-3GPP technology.

An access network that implements a network access function by using a wireless communication technology may be referred to as a RAN. The radio access network can be responsible for functions such as radio resource management, quality of service (quality of service, QoS) management, and data compression and encryption on an air interface side. The radio access network provides an access service for the terminal device, and further completes forwarding of a control signal and user data between a terminal and a core network.

For example, the radio access network may include but is not limited to: a macro base station, a micro base station (also referred to as a small cell), a radio network controller (RNC), a NodeB (NB), a base station controller (base station controller, BSC), a base transceiver station (BTS), a home NodeB (for example, a home evolved NodeB, or a home NodeB, HNB), a baseband unit (BBU), an AP in a Wi-Fi system, a radio relay node, a radio backhaul node, a transmission point (transmission point, TP), or a transmission and reception point (TRP). Alternatively, the radio access network may include a gNB or a transmission point (TRP or TP) in a 5G (for example, NR) system, or one antenna panel or a group of antenna panels (including a plurality of antenna panels) of a base station in the 5G system. Alternatively, the radio access network may include a network node constituting a gNB or a transmission point, for example, a baseband unit (BBU), a distributed unit (DU), or a base station in a next-generation 6G communication system. A specific technology and a specific device form that are used by a radio access network device are not limited in embodiments of this disclosure.

The access network may provide a service for a cell. The terminal device may communicate with the cell by using a transmission resource (for example, a frequency domain resource or a spectrum resource) allocated by the access network device.

3. An AMF network element is mainly used for mobility management, access management, and the like, for example, user location update, registration of a user with a network, and user handover. The AMF may be further configured to implement a function other than session management in a mobility management entity (MME), for example, a lawful interception function or an access authorization (or authentication) function.

4. An SMF network element is mainly used for session management, internet protocol (Internet Protocol, IP)

address assignment and management for a UE, manageable user plane function selection, a termination point of a policy control or charging function interface, a downlink data notification, and the like. In embodiment of this disclosure, the SMF is mainly responsible for session management in a mobile network, for example, session establishment, modification, and release. Specific functions may include, for example, assigning an IP address to the terminal device, and selecting a UPF that provides a packet forwarding function.

5. A UPF network element is responsible for forwarding and receiving user data in a terminal device. For example, the UPF network element may receive user data from a data network (DN), and transmit the user data to the terminal device through an access network device. Alternatively, the UPF network element may receive user data from the terminal device through an access network device, and forward the user data to a data network. A transmission resource and a scheduling function in the UPF network element that provide a service for the terminal device are managed and controlled by an SMF network element.

6. A data network (DN) is a service network used to provide a data service for a user, for example, the Internet, a third-party service network, and an IP multimedia service IMS) network.

7. An authentication service network element (authentication server function, AUSF) is mainly used for user authentication and the like.

8. A network exposure function (network exposure function, NEF) network element is mainly configured to support capability and event exposure, for example, securely expose, to the outside, a service, a capability, and the like that are provided by a 3GPP network function.

9. A network repository network element (network function (NF) repository function, NRF) is configured to store description information of a network functional entity and a service provided by the network functional entity, and support service discovery, network element entity discovery, and the like.

10. A PCF network element is configured to: provide guidance on a unified policy framework for network behavior, provide policy rule information for a control plane function network element (such as an AMF network element or an SMF network element), obtain user subscription information related to policy decision-making, and the like.

11. A UDM network element is configured to generate an authentication credential, process a subscriber identifier (for example, store and manage a subscription permanent identifier), control access authorization, manage subscription data, and the like.

12. An application function (AF) network element mainly supports interaction with a 3GPP core network to provide a service, for example, affecting data routing decision-making, interacting with a policy control function (PCF), or providing a third party for a network side.

In the network architecture shown in FIG. 1, network elements may communicate with each other through interfaces shown in the figure, and some interfaces may be implemented in a manner of service-based interfaces. As shown in the figure, the UE and the AMF may interact with each other through an N1 interface, and an interaction message may be referred to as, for example, an N1 message (N1 Message). The RAN and the AMF may interact with each other through an N2 interface, and the N2 interface may be used to send a non-access stratum (non-access stratum, NAS) message and the like. The RAN and the UPF may interact with each other through an N3 interface, and the N3 interface may be used to transmit user plane data and the like. The SMF and the UPF may interact with each other through an N4 interface, and the N4 interface may be used to transmit information such as tunnel identifier information of an N3 connection, data buffering indication information, and a downlink data notification message. The UPF and the DN may interact with each other through an N6 interface, and the N6 interface may be used to transmit user plane data and the like. Relationships between other interfaces and network elements are shown in FIG. 1. For brevity, details are not described herein.

It should be understood that the foregoing network architecture applied to embodiments of this disclosure is merely an example of a network architecture described from the perspective of a conventional point-to-point architecture and a service architecture, and a network architecture applicable to embodiments of this disclosure is not limited thereto. Any network architecture that can implement functions of the foregoing network elements is applicable to embodiments of this disclosure.

It should be further understood that the AMF, the SMF, the UPF, a network slice selection function (NSSF) network element, the NEF, the AUSF, the NRF, the PCF, and the UDM shown in FIG. 1 may be understood as network elements configured to implement different functions in a core network, for example, may be combined into a network slice as required. These core network elements may be independent devices, or may be integrated into a same device to implement different functions. Specific forms of the foregoing network elements are not limited in this disclosure.

It should be further understood that the foregoing names are defined merely for distinguishing between different functions, and should not constitute any limitation on this disclosure. This disclosure does not exclude a possibility of using other names in the 5G network and another future network. For example, in a 6G network, some or all of the foregoing network elements may still use terms in 5G, may use other names. Names of interfaces between the foregoing network elements in FIG. 1 are merely examples, and the interfaces may have other names during specific implementation. This is not specifically limited in this disclosure. In addition, names of messages (or signaling) transmitted between the foregoing network elements are merely examples, and do not constitute any limitation on functions of the messages.

To facilitate understanding of embodiments of this disclosure, terms used in this disclosure are first briefly described.

1. Protocol Data Unit (Protocol Data Unit, PDU) Session (PDU Session)

A 5G core network (5G core network, 5GC) supports a PDU connectivity service. The PDU connectivity service may be a service of exchanging a PDU data packet between a terminal device and a DN. The PDU connection service is implemented by initiating establishment of a PDU session by the terminal device. After one PDU session is established, a data transmission channel between one terminal device and the DN is established. In other words, the PDU session is at a UE level. Each terminal device may establish one or more PDU sessions. The terminal device may access the DN by using the PDU session established between the terminal device and the DN.

As described above, the SMF is mainly responsible for session management in a mobile network. The PDU session may be established, modified, or released between the terminal device and the SMF by using NAS session management (session management, SM) signaling.

In an embodiment of this disclosure, the terminal device may establish a plurality of PDU sessions or a plurality of PDU connectivity services. For example, the terminal device may establish two or more PDU sessions. This is not limited for the plurality of PDU sessions. For example, DN identifiers (DNNs) of these PDU sessions may be different or the same. For another example, different PDU sessions may be served by a same SMF or different SMFs. For still another example, establishment of these PDU sessions may be initiated simultaneously or sequentially.

2. Secondary Authentication

In terms of network security, a primary task of a network is to authenticate and authorize terminals that access the network. A terminal device can access a 3GPP network only after being authenticated, and further request to establish a PDU session to access various services on a DN.

In a current 4G network, authentication and authorization of the terminal device are directly performed by an operator network. In 5G standardization, this type of authentication method is referred to as primary authentication, or may be referred to as first-level authentication. With development of vertical industries and the internet of things, authentication and authorization will also be required for the terminal device that accesses the DN (although the terminal device accesses the DN by using the operator network) outside the operator network. To meet this requirement, 3GPP defines a new authentication manner in 5G security standardization, which is referred to as secondary authentication, or may be referred to as second-level authentication. In this authentication manner, a data network outside the operator network may authenticate or authorize the terminal device by using the operator network.

After the terminal device accesses the operator network, and first-level authentication performed between the terminal device and the operator network succeeds, if the terminal device needs to access a DN, the terminal device establishes a PDU session with the operator network. In a process in which the terminal device establishes the PDU session with the network, second-level authentication is performed between the terminal device and an authentication server (namely, an authentication network element) corresponding to the DN. The authentication server corresponding to the DN includes a network element configured to perform secondary authentication. Establishment of the PDU session may be triggered by the terminal device or a core network (core network, CN) of the operator network. During or after establishment of the PDU session, the operator network initiates a secondary authentication procedure. For example, the terminal device may send an authentication request to the operator network, and the operator network may forward the authentication request to the authentication server corresponding to the DN, so that the authentication server corresponding to the DN performs authentication and/or authorization between the DN and the terminal device. The authentication server corresponding to the DN (for example, an authentication server of the DN for short) may be, for example, an authentication, authorization, and accounting (authentication, authorization, and accounting, AAA) server (server) (AAA server). A result of authentication and/or authorization performed on the terminal device by the authentication server corresponding to the DN is sent to the operator network, and the operator network determines, based on the result, whether to establish a corresponding PDU session connection for the terminal device.

For ease of understanding, the secondary authentication procedure is briefly described with reference to FIG. 2.

201: The terminal device sends a registration request to the AMF.

202: Perform first-level authentication between the terminal device and an operator network.

After receiving the registration request sent by the terminal device, the AMF may trigger the AUSF to perform first-level authentication between the terminal device and the operator network.

Optionally, when performing first-level authentication between the terminal device and the operator network, the AUSF may obtain authentication information that is required for first-level authentication and that is from the UDM, and may further implement first-level authentication between the terminal device and the operator network based on the authentication information generated or stored by the UDM.

203: Establish NAS security between the terminal device and the AMF.

After the first-level authentication between the terminal device and the operator network succeeds, the AMF may establish the NAS security with the terminal device. A NAS exists in a wireless communication protocol stack of a universal mobile telecommunications system (universal mobile telecommunications system, UMTS), and serves as a functional layer between the CN and the terminal device. The NAS supports signaling and/or data transmission between the CN and the terminal device.

204: The terminal device initiates a session establishment request.

After the NAS security between the terminal device and the AMF is established, the terminal device may initiate the session establishment request to the AMF. For example, the session establishment request may be used to request to establish a PDU session. The terminal device sends a NAS message to the AMF, and the session establishment request may be carried in the NAS message.

205: The AMF sends the session establishment request to the SMF.

After receiving the NAS message sent by the terminal device, the AMF may decode the NAS message to obtain the session establishment request, and then send the session establishment request to the SMF. The SMF is an SMF to which the PDU session of which establishment is requested by the session establishment request requests to connect.

206: The SMF checks subscription data.

After receiving the session establishment request, the SMF obtains the subscription data from the UDM. If the subscription data indicates that secondary authentication needs to be performed, step 207 may be performed.

207: The SMF starts an extensible authentication protocol (extensible authentication protocol, EAP) authentication procedure.

Optionally, if the session establishment request does not carry the authentication information, steps 208 and 209 are performed; or if the session establishment request carries the authentication information, steps 208 and 209 may be skipped.

208: The SMF sends an EAP request to the terminal device.

The SMF sends the EAP request to the terminal device, to request identity information of the terminal device.

209: The terminal device feeds back an EAP response to the SMF.

The terminal device feeds back the EAP response to the SMF, to notify the identity information of the terminal device.

210: The SMF initiates to establish an N4 interface session connection to the UPF.

If no UPF configured to transmit a message between the SMF and the authentication server (for example, the AAA server) of the DN exists, the SMF initiates to establish the N4 interface session connection to the UPF.

It may be understood that if the UPF configured to transmit a message between the SMF and the authentication server of the DN exists, step 210 may not be performed.

211: The SMF sends the EAP response and identity information of the terminal device to the authentication server of the DN.

Figure 2:
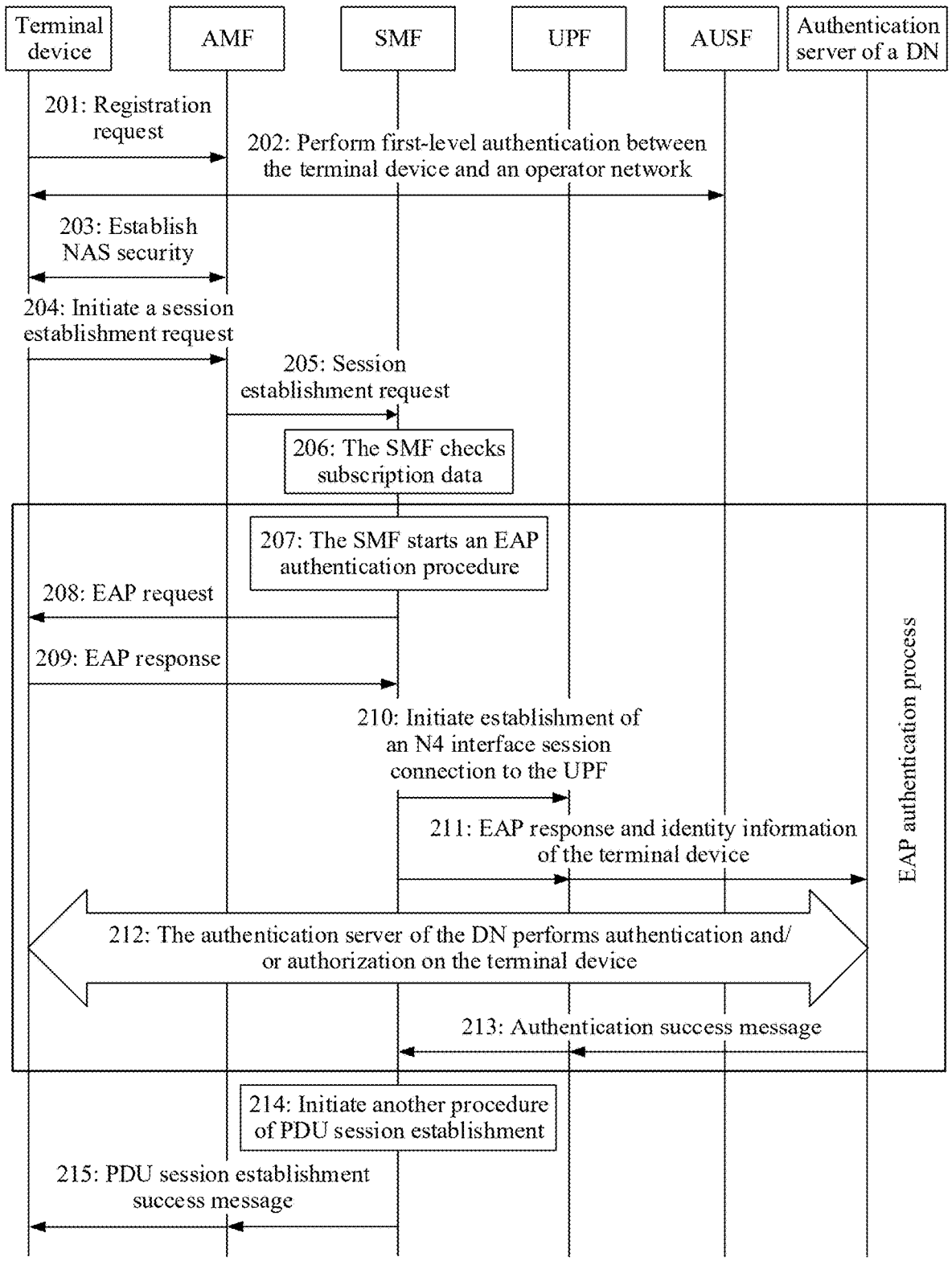
FIG. 2 is a schematic diagram of a secondary authentication procedure.

As shown in FIG. 2, the SMF sends the EAP response and the identity information of the terminal device to the authentication server of the DN by using the UPF.

The SMF sends, to the UPF through the N4 interface session connection established in step 210, the EAP response sent by the terminal device and the authentication information (namely, the identity information of the terminal device). The UPF sends the EAP response and the identity information of the terminal device to the authentication server of the DN.

212: The authentication server of the DN performs authentication and/or authorization on the terminal device.

The terminal device and the authentication server of the DN may exchange EAP messages for one or more times, to complete authentication of the authentication server of the DN on the terminal device.

A message type, an exchange manner, or the like of an EAP message exchanged between the terminal device and the authentication server of the DN depends on a specifically used EAP authentication method. This is not limited in this disclosure.

213: The authentication server of the DN sends an authentication success message to the SMF by using the UPF.

If successfully authenticating the terminal device, the authentication server of the DN may send the authentication success message to the UPF, and send the authentication success message to the SMF by using the UPF and the N4 interface session connection.

214: The SMF initiates another procedure of PDU session establishment.

After EAP authentication of the authentication server of the DN on the terminal device ends, the SMF may continue to initiate another procedure of the PDU session establishment. For example, the another procedure of the PDU session establishment may include but is not limited to: the SMF sending an N4 interface session establishment/modification request to the UPF, and the UPF feeding back an N4 interface session establishment/modification response to the SMF.

215: The SMF sends a PDU session establishment success message to the terminal device by using the AMF.

The SMF sends the PDU session establishment success message to the AMF, and the AMF forwards the PDU session establishment success message to the terminal device.

It should be understood that steps 201 to 215 are merely examples for description, and do not limit the protection scope of this embodiment of this disclosure.

3. Multi-PDU Session Scenario

In actual communication, for a same DN, in some scenarios, one terminal device may establish two or more PDU sessions. The following describes several possible scenarios.
Scenario 1: Ultra-Reliable and Low-Latency Communication (Ultra-Reliable Low-Latency Communication, URLLC)

To ensure reliable transmission of a service, when an initiated service has a high reliability requirement, the terminal device may establish, by using an operator network, a plurality of PDU sessions (for example, two PDU sessions) for transmitting a same service. That is, the plurality of PDU sessions are used to access the same DN. The two PDU sessions are used as an example. For details, refer to FIG. 3.

Figure 3:
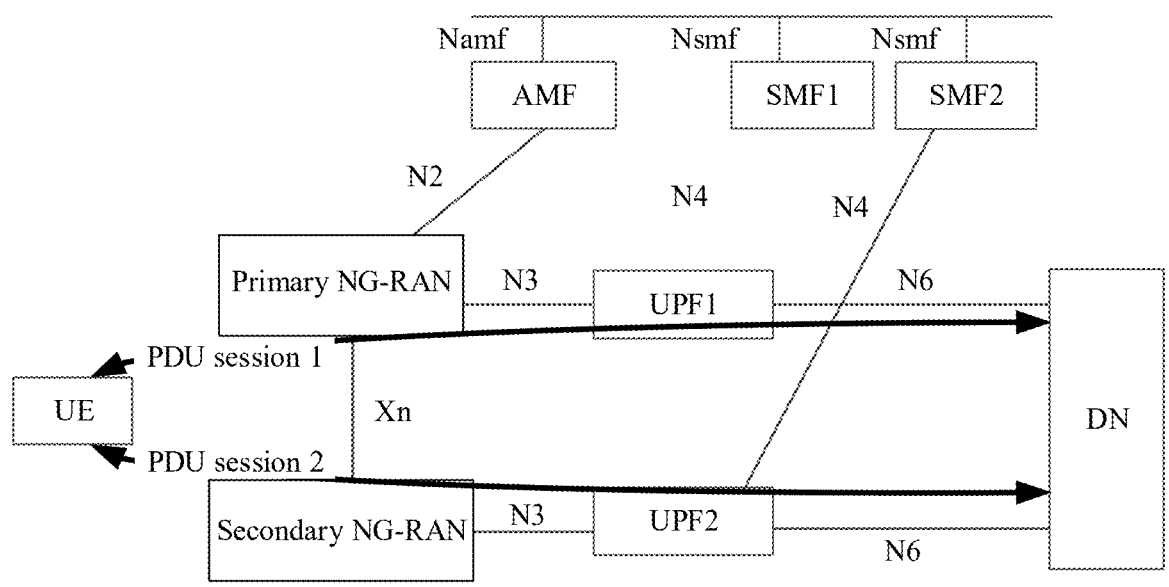
FIG. 3 and FIG. 4 are each a schematic diagram of a multi-PDU session scenario applicable to an embodiment of this disclosure.

As shown in FIG. 3, two PDU sessions: a PDU session 1 and a PDU session 2 established between the terminal device and the DN may be served by different SMFs, for example, an SMF 1 and an SMF 2. The PDU session 1 and the PDU session 2 are connected to the same DN. It should be understood that the plurality of PDU sessions established between the terminal device and the DN may alternatively be served by a same SMF. The plurality of PDU sessions are established between the terminal device and the DN. When the plurality of PDU sessions are used to access the same DN, DNNs and/or network identifiers (for example, single network slice selection assistance information (single network slice selection assistance information, S-NSSAI)) provided by the terminal device are different. For example, the DNNs provided by the terminal device are different. For another example, the S-NSSAI provided by the terminal device is different. For still another example, both the DNNs and the S-NSSAI that are provided by the terminal device are different.

Scenario 2: Edge Computing (Edge Computing, EC) Communication

Figure 4:
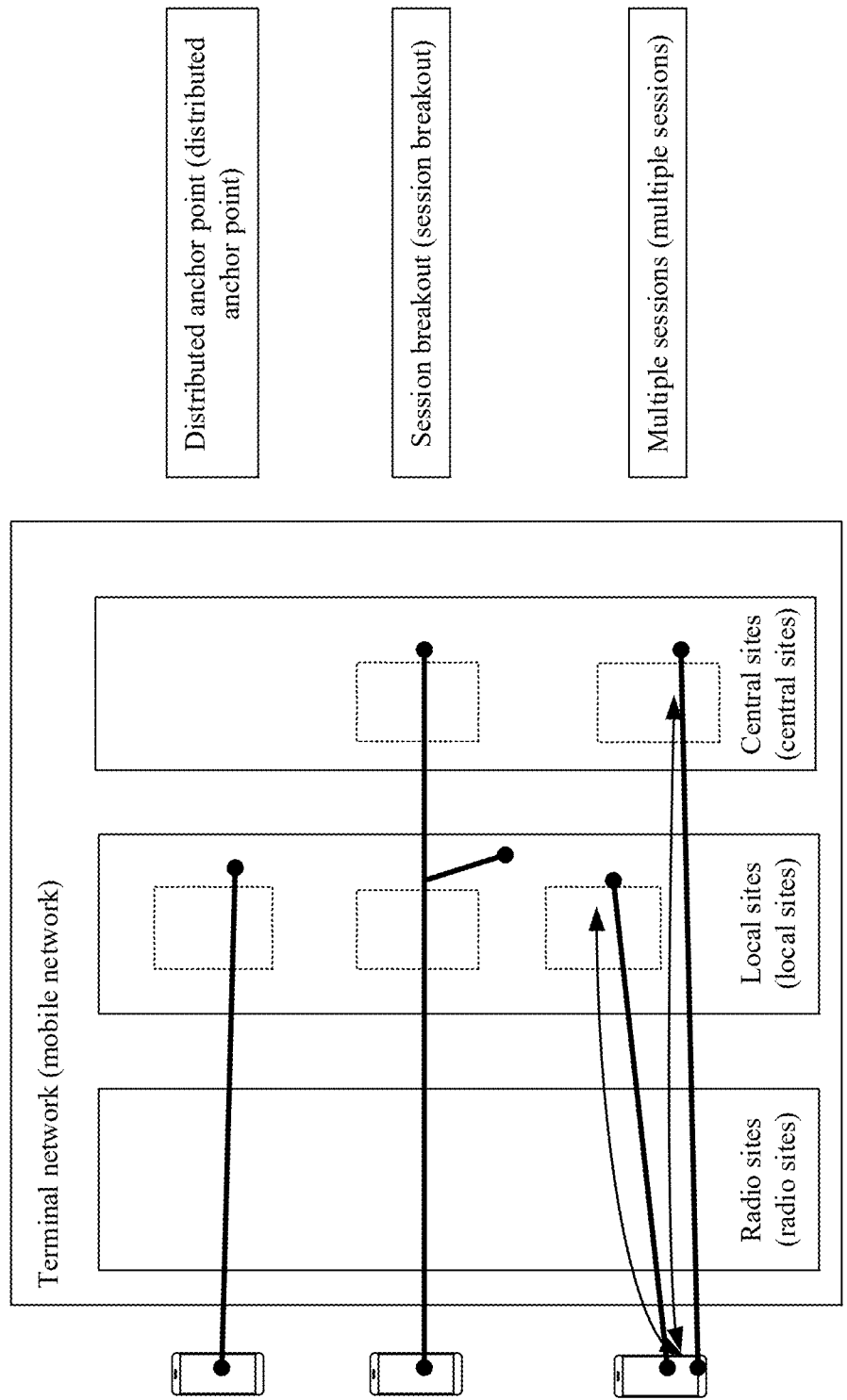

In EC communication, to support a service that accesses to an EC environment, three access manners may be included, as shown in FIG. 4.

As shown in FIG. 4, an access manner 1 is to use a distributed anchor point (distributed anchor point). The terminal device establishes a PDU session, and the PDU session is used to access the service in the local EC environment. An access manner 2 is to use session breakout (session breakout). The terminal device establishes a PDU session, and the PDU session may access the service in the local EC environment, and may further access a service centrally deployed at a remote end. In other words, traffic routing may be implemented in the access manner 2. Specifically, for example, the traffic routing may be implemented by using an uplink classifier (Uplink Classifier, UL CL), or may be implemented by using a branching point (branching point, BP). This is not limited. It should be understood that the access manner 1 and the access manner 2 are merely examples for description, and do not limit the protection scope of this embodiment of this disclosure.

Access manner 3: The terminal device simultaneously establishes a plurality of PDU sessions (for example, two PDU sessions). One PDU session is used to access the service in the local EC environment, and the other PDU session is used to access a service centrally deployed at a remote end. It should be understood that the plurality of PDU sessions may be established at different times as required, or may be simultaneously established, and SMFs serving the PDU sessions may be the same or different. In addition, DNNs used to establish the PDU sessions may alternatively be different. It may be learned that in EC communication, a scenario in which the terminal device establishes the plurality of PDU sessions may also occur.

Scenario 3: Sessions Having a Same DN but Different Requirements

For the same DN, different services may have different requirements, for example, different service continuity requirements. To ensure service continuity, a make-before-break manner is used. Make-before-break is a mechanism in which a new path is established before an original path is torn down. In this case, two PDU sessions are also established between the terminal device and the operator network. In this case, DNNs of the plurality of PDU sessions may be the same or different.

It can be learned from the foregoing three scenarios that, for the same DN, one terminal device may establish two or more PDU sessions. The two or more PDU sessions may be simultaneously established, or may be established at different times as required, and DNNs used to establish the two or more PDU sessions may be different.

The foregoing briefly describes the scenario with the plurality of PDU sessions applicable to this embodiment of this disclosure. It should be understood that this embodiment of this disclosure is not limited thereto. Any scenario with the plurality of PDU sessions is applicable to this embodiment of this disclosure.

For secondary authentication in the scenario with the plurality of PDU sessions, two PDU sessions are used as an example to briefly describe an existing solution.

The existing solution includes: The terminal device initiates to establish the first PDU session, and the SMF determines, through determining, to perform secondary authentication, and stores authentication success information locally or in the UDM. The authentication information includes a DNN. During establishment of the second PDU session, the SMF obtains the authentication information (which may be the locally stored authentication information or the authentication information obtained from the UDM) of the first PDU session. The SMF determines, based on that a DNN in a request for the second PDU session is the same as the DNN in the authentication information of the first PDU session, not to perform a secondary authentication procedure, and authorizes to establish a newly initiated PDU session (namely, the second PDU session), in other words, continues to perform a subsequent procedure of PDU session establishment.

In the existing solution, this manner in which the SMF determines, depending on whether the DNNs in the authentication information are the same, whether to initiate the secondary authentication procedure has limited application scenarios. As a result, the secondary authentication procedure is performed for a plurality of times for the plurality of PDU sessions that access the same DN, causing additional signaling overheads. For example, when the plurality of PDU sessions that access the same DN use different DNNs, in the foregoing solution, a new PDU session used to access the same DN cannot be recognized. Consequently, the plurality of secondary authentication procedures are performed for the plurality of PDU sessions that access the same DN, resulting in the additional signaling overheads.

Figure 5:
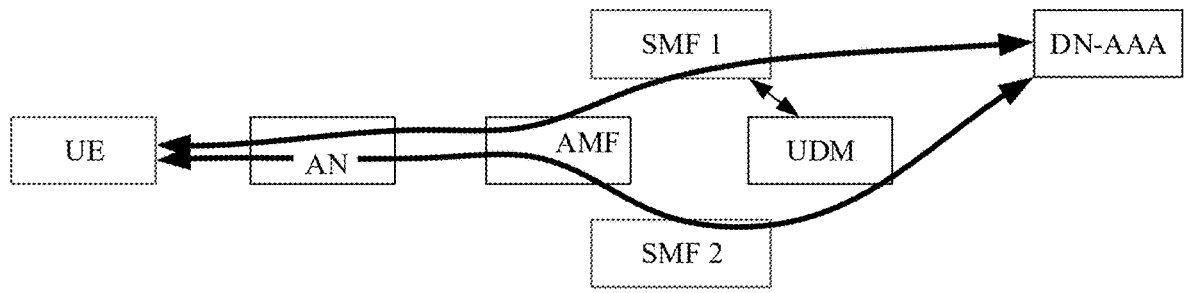
FIG. 5 is a schematic diagram in which a plurality of PDU sessions are served by different SMFs.

In addition, a scenario to which the existing solution is mainly applicable is as follows: When the terminal device initiates an establishment procedure of the second PDU session, a secondary authentication procedure initiated by the SMF between the terminal device and the DN has been completed, and a result is stored in the SMF or the UDM. If the secondary authentication procedure is being performed on the terminal device when the terminal device initiates the second PDU session, the SMF cannot determine, based on existing logic, to skip the secondary authentication procedure. Especially when the two PDU sessions are served by different SMFs, as shown in FIG. 5, the first PDU session is served by an SMF 1, and the second PDU session is served by an SMF 2. This may also cause additional signaling overheads.

In view of this, this disclosure provides a method, so that this disclosure is not only applicable to more scenarios, but also signaling overheads caused by repeatedly performing secondary authentication are reduced, and this solution is simple and easy to implement.

The following describes in detail embodiments provided in this disclosure with reference to the accompanying drawings.

Figure 6:
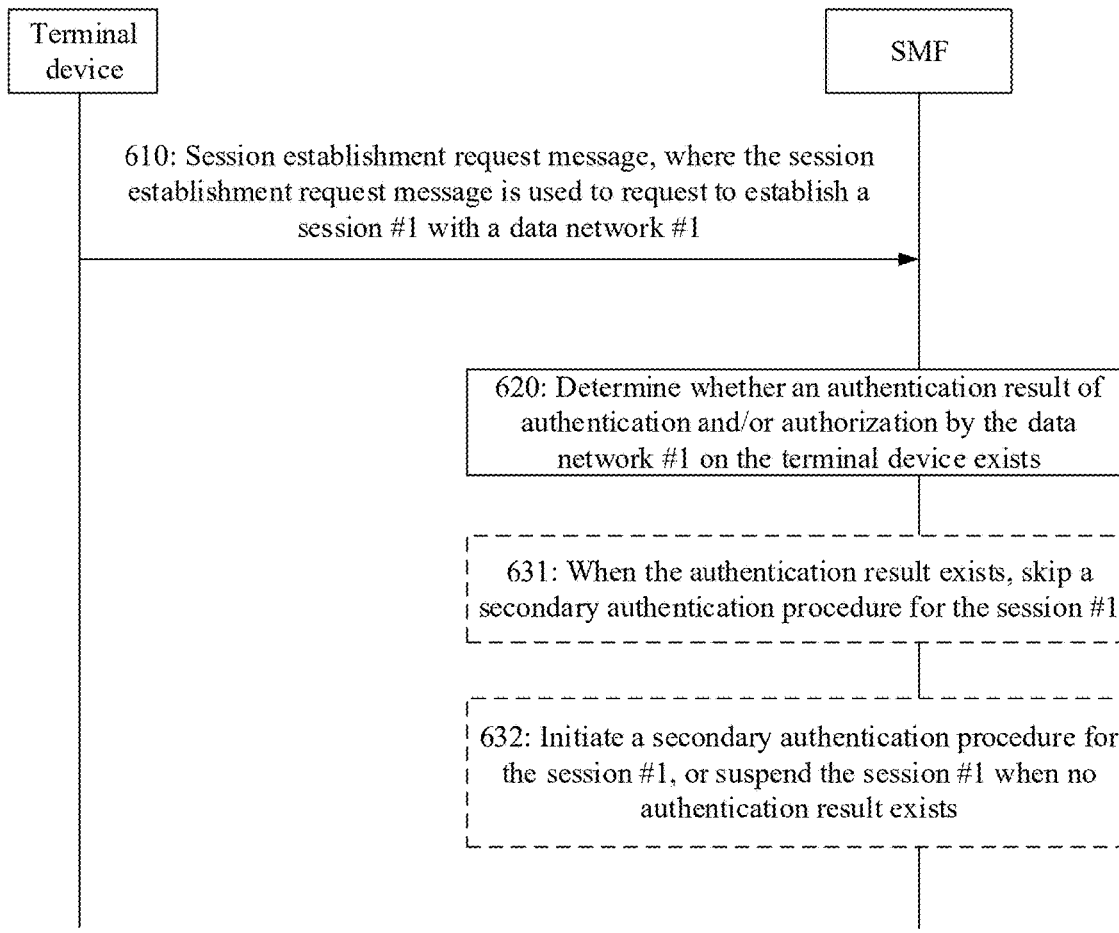
FIG. 6 is a schematic diagram of an authentication and authorization method according to an embodiment of this disclosure.

FIG. 6 is a schematic interaction diagram of an authentication and authorization method 600 according to an embodiment of this disclosure. The method 600 may include the following steps.

610: An SMF receives a session establishment request message from a terminal device, where the session establishment request message is used to request to establish a session #1 with a data network #1.

For differentiation and without loss of generality, in step 610, a session that the terminal device requests to establish is denoted as the session #1, and a data network that the terminal device requests to access is denoted as the data network #1.

The terminal device initiates a session establishment request, where the session establishment request may be, for example, used to request to establish a PDU session with the data network. For example, the terminal device initiates a PDU session establishment request to an AMF, and the AMF sends the PDU session establishment request to the SMF.

During session establishment, the SMF may determine, depending on whether an authentication result of authentication and/or authorization by the data network #1 on the terminal device exists, whether to initiate a secondary authentication procedure.

620: The SMF determines whether an authentication result of authentication and/or authorization by the data network #1 on the terminal device exists.

The authentication result may also be referred to as an authentication and authorization result, and is used to determine whether the data network #1 has authenticated and authorized the terminal device. For example, the authentication result may be an authentication result for another session of the terminal device (for example, indicating that secondary authentication for the another session succeeds or fails).

Optionally, the authentication result may include time information, namely, valid information of the authentication result or a valid authentication result. For example, the authentication result includes an authentication time range. Within the authentication time range, the authentication result is valid. Beyond the authentication time range, the authentication result is invalid. It should be understood that this is merely an example for description, and does not limit the protection scope of embodiments of this disclosure. For example, beyond the authentication time range, the authentication result may not be stored any more.

In a possible case, the authentication result indicates that the authentication succeeds. To be specific, the SMF may determine whether the data network #1 has successfully authenticated and authorized the terminal device.

In another possible case, the authentication result indicates that the authentication fails. To be specific, the SMF may determine whether the data network #1 has failed to authenticate and authorize the terminal device.

The following describes in detail a solution in which the SMF determines whether the authentication result exists.

The method 600 may include a step: step 631 or step 632.

631: When the authentication result exists, skip a secondary authentication procedure for the session #1.

In a possible case, the SMF determines that the data network #1 successfully authenticates and authorizes the terminal device. In this case, the SMF skips the secondary authentication procedure for the session #1, and establishes the session #1 by using authorization information indicating that the authentication succeeds. In this case, for a possible step after the SMF determines to skip the secondary authentication procedure for the session #1, refer to step 706B in the following method 700.

In another possible case, the SMF determines that the data network #1 fails to authenticate and authorize the terminal device. It may be understood that, after failing to authenticate and authorize the terminal device, the data network may record a failure result (or determine, in consideration of a failure reason, whether to record a failure result), for example, duration. In this way, when the terminal device requests to access the data network again, the SMF may determine, based on the result indicating that the authentication fails, not to initiate secondary authentication on the terminal device. In addition, in this case, the SMF may reject establishment of the session #1.

In this disclosure, a person skilled in the art should understand a meaning of skipping the secondary authentication procedure mentioned for a plurality of times. The skipping the secondary authentication procedure includes skipping all or some steps of the secondary authentication procedure. For example, the skipping the secondary authentication procedure may include: skipping steps 207 to 213 described above, or skipping steps 210 to 213, or skipping steps 212 and 213. For example, when the authentication result indicates that the authentication succeeds, and it indicates that the data network has authenticated and authorized the terminal device, the terminal device may access the data network or communicate with the data network based on the previous authentication result.

632: Initiate a secondary authentication procedure for the session #1, or suspend the session #1 when no authentication result exists.

In a possible case, when no authentication result exists, the secondary authentication procedure is initiated for the session #1.

When the data network #1 has not authenticated the terminal device, the secondary authentication procedure may be initiated for the session #1. For details, refer to step 706A in the following method 700.

In another possible case, when no authentication result exists, the session #1 is suspended.

The data network #1 may be authenticating the terminal device or is to authenticate the terminal device. In this case, after determining that the data network #1 is authenticating the terminal device or is to authenticate the terminal device, the SMF may suspend the session #1. Suspending the session #1, or stopping establishment of the session #1, indicates temporarily stopping establishment of the session #1 or temporarily stopping the secondary authentication procedure for the session #1, for example, may indicate waiting for an authentication result for another session, and determining, based on the authentication result for the another session, how to process the session #1. The authentication result for the another session may indicate that the secondary authentication for the another session succeeds or fails.

In a possible scenario, when establishing the session #1, the terminal device also includes session information (for example, a session ID) of another session (for example, denoted as a session #2). In this indication manner, the session #1 and the session #2 are redundant for each other, that is, are connected to the same DN. For the session #1, the SMF may further determine that secondary authentication does not need to be initiated, or reuse an authentication and authorization result for the another session #2 (for example, suspend the session #1, and wait for the authentication and authorization result for the session #2). In a URLLC scenario, the session #1 indicated by indication information #1 sent by the terminal device is a redundant session. In the scenario, the SMF does not need to perform secondary authentication, and the SMF may obtain a result based on the indication information #1. In other words, when the SMF needs to initiate the secondary authentication, the SMF always initiates the secondary authentication for the another session (for example, the session #2), and directly skips the secondary authentication for the session #1.

In another possible scenario, the terminal device initiates two sessions, where one is denoted as a session #1, and the other is denoted as a session #3. An establishment request message of the session #1 includes indication information, where the indication information indicates to suspend the session #1, or indicates that the data network #1 is to perform secondary authentication for another session (namely, the session #3). In this scenario, based on the indication information, the SMF may alternatively skip the secondary authentication procedure or suspend the session #1. Optionally, in this scenario, the SMF may request or subscribe to a result of the secondary authentication to a UDM, to process the suspended session #1 based on the result of the secondary authentication.

In this disclosure, "being performing secondary authentication" mentioned for a plurality of times may include "being performing secondary authentication", or may include "being to perform secondary authentication", for example, "being to perform secondary authentication" or "being performing secondary authentication" for the another session. For brevity, the following uniformly uses "being performing secondary authentication" for description.

The following describes this case in detail with reference to Aspect 2.

According to some embodiments of this disclosure, during session establishment, the SMF may determine, depending on whether the data network has authenticated the terminal device, whether to initiate the secondary authentication procedure, or the SMF may determine, depending on whether the data network is authenticating or is to authenticate the terminal device, whether to suspend the session. That is, an authentication and authorization procedure is used by the data network to authenticate and authorize whether the terminal device can establish the session to access the data network. Therefore, it can be ensured that in a scenario in which different DNNs are used to identify the data network and in a scenario in which sessions are simultaneously established or another session is being authenticated during session establishment, the secondary authentication procedure can also be prevented from being repeatedly performed. According to embodiments of this disclosure, it can be ensured that even if different DNNs are used to access the data network, the SMF can also prevent the secondary authentication procedure as much as possible from being repeatedly performed.

The following describes an embodiment of this disclosure in detail with reference to content of several aspects. The content of the following aspects may be used independently, or may be used in combination. This is not limited.

Aspect 1: Manners in which the SMF determines whether an authentication result exists:

Implementation 1: The SMF may determine, based on the authentication and authorization information, whether the authentication result exists.

For example, the SMF may determine whether the authentication result exists in an authenticated dataset. The authenticated dataset indicates that data or information has been authenticated. For example, the SMF may determine whether a data network that has authenticated the terminal device includes the data network #1, or the SMF may determine whether a terminal device that the data network #1 has authenticated includes the terminal device. The authenticated dataset may include two datasets, for example, a successfully authenticated dataset and an unsuccessfully authenticated dataset. The SMF may determine, from the successfully authenticated dataset and the unsuccessfully authenticated dataset, whether the authentication result exists.

For example, the terminal device sends, to the SMF, a DNN, for example, denoted as a DNN #1, used to identify the data network #1. The authentication and authorization information includes successfully authorized DNNs. Whether the DNN #1 exists in the successfully authorized DNNs is determined, to determine whether the authentication result exists, for example, whether the terminal device has been successfully authenticated and authorized.

Optionally, the authentication and authorization information may further include but is not limited to one or more of the following: a data network-specific identifier (DN-Specific ID), an identifier (Identifier, Id) of an authentication server of the data network (such as a DN-AAA Id), validity information, an index (index) of a text authorized by the data network, a session-aggregate maximum bit rate (aggregate maximum bit rate, AMBR) authorized by the data network, an allowed MAC address(es), an allowed virtual local area network (virtual local area network, VLAN) identifier (VLAN Identifier, VID) (VIDs), a session information reporting indication, and session management and control related information. The session information reporting indication indicates to report related information of the session, for example, address information of the session.

When the DNN included in the authentication and authorization information is the same as the DNN #1, a same data network is indicated, in other words, secondary authentication does not need to be performed. When the DNN included in the authentication and authorization information is different from the DNN #1, whether the DNN included in the authentication and authorization information and the DNN #1 are equivalent DNNs, in other words, whether a same data network is indicated, may be determined. The equivalent DNN is a DNN that identifies the same data network.

For example, a plurality of DNNs (or one DNN list) (namely, equivalent DNNs) may be preconfigured to indicate the same data network. For example, the SMF obtains the plurality of DNNs based on the obtained authentication and authorization information.

For example, the DNN #1 is a DNN 1, and the plurality of DNNs (namely, the equivalent DNNs) in the authentication and authorization information include {DNN 1, DNN 2, and DNN 3}. In this case, it indicates that the data network that has performed authentication and authorization and the data network #1 that the terminal device requests to access are the same data network. In other words, the terminal device has previously been authenticated with the data network that the terminal device requests to access, and the secondary authentication procedure does not need to be performed again. In this case, the method 600 may include step 631.

For another example, the DNN #1 is a DNN 5, and the plurality of DNNs (namely, the equivalent DNNs) in the authentication and authorization information include {DNN 1, DNN 2, and DNN 3}. In this case, it indicates that the data network that has performed authentication and authorization and the data network #1 that the terminal device requests to access are different data networks. In other words, the terminal device has not been authenticated with the data network that the terminal device requests to access, and the secondary authentication procedure needs to be performed. In this case, the method 600 may include step 632.

Optionally, the authentication and authorization information may be obtained based on any one of the following.

In an example, the SMF may obtain the authentication and authorization information by using a context of the terminal device. In other words, the SMF may obtain the context of the terminal device, and determine, based on the context of the terminal device, whether to initiate the secondary authentication procedure for the session #1.

In another example, the SMF locally obtains the stored authentication and authorization information.

In another example, the SMF obtains the authentication and authorization information from the authentication server of the data network.

In another example, the SMF obtains the authentication and authorization information from the UDM.

Figure 7:
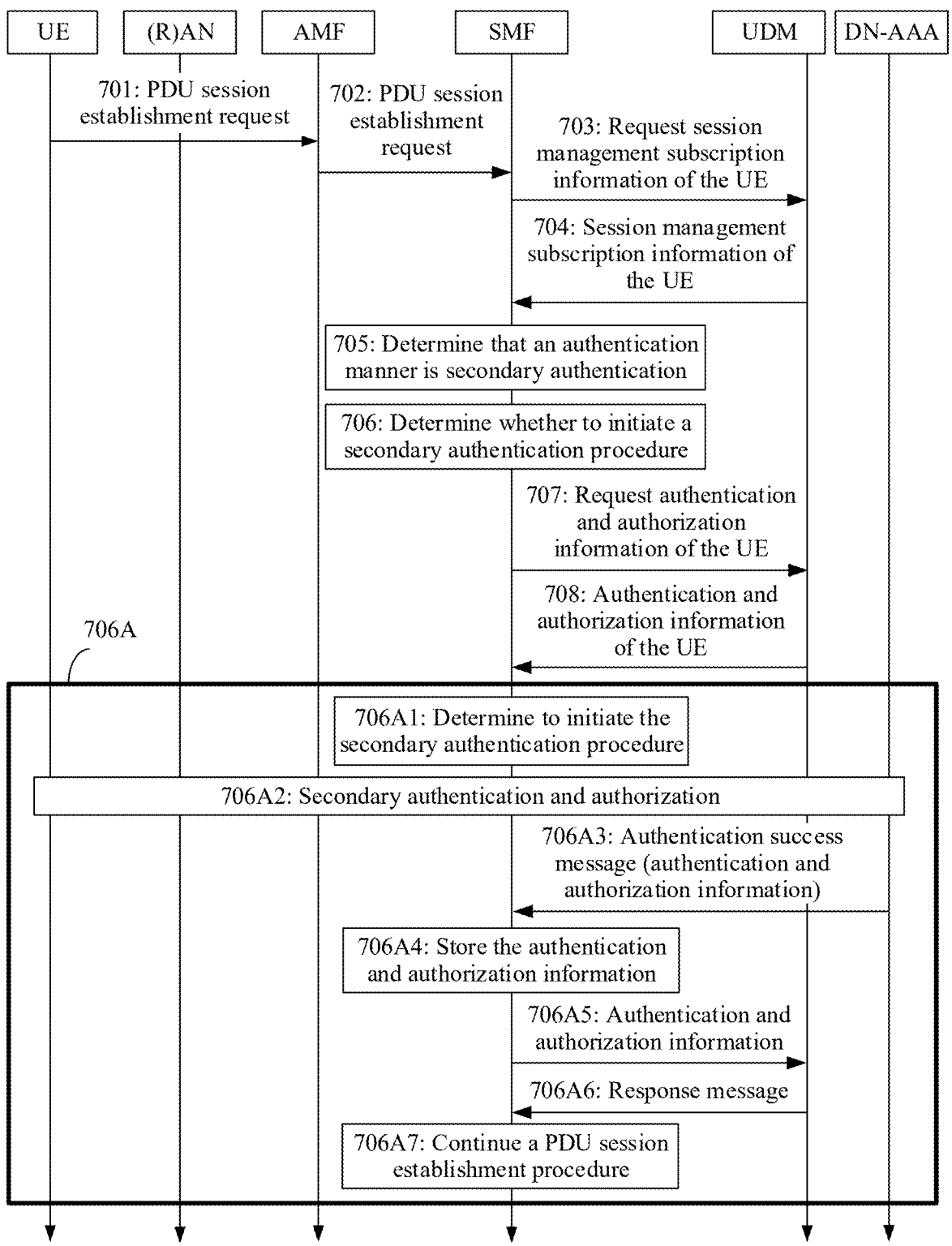
FIG. 7(1) and FIG. 7(2) are schematic diagrams of an authentication and authorization method applicable to an embodiment of this disclosure.
Figure 7:
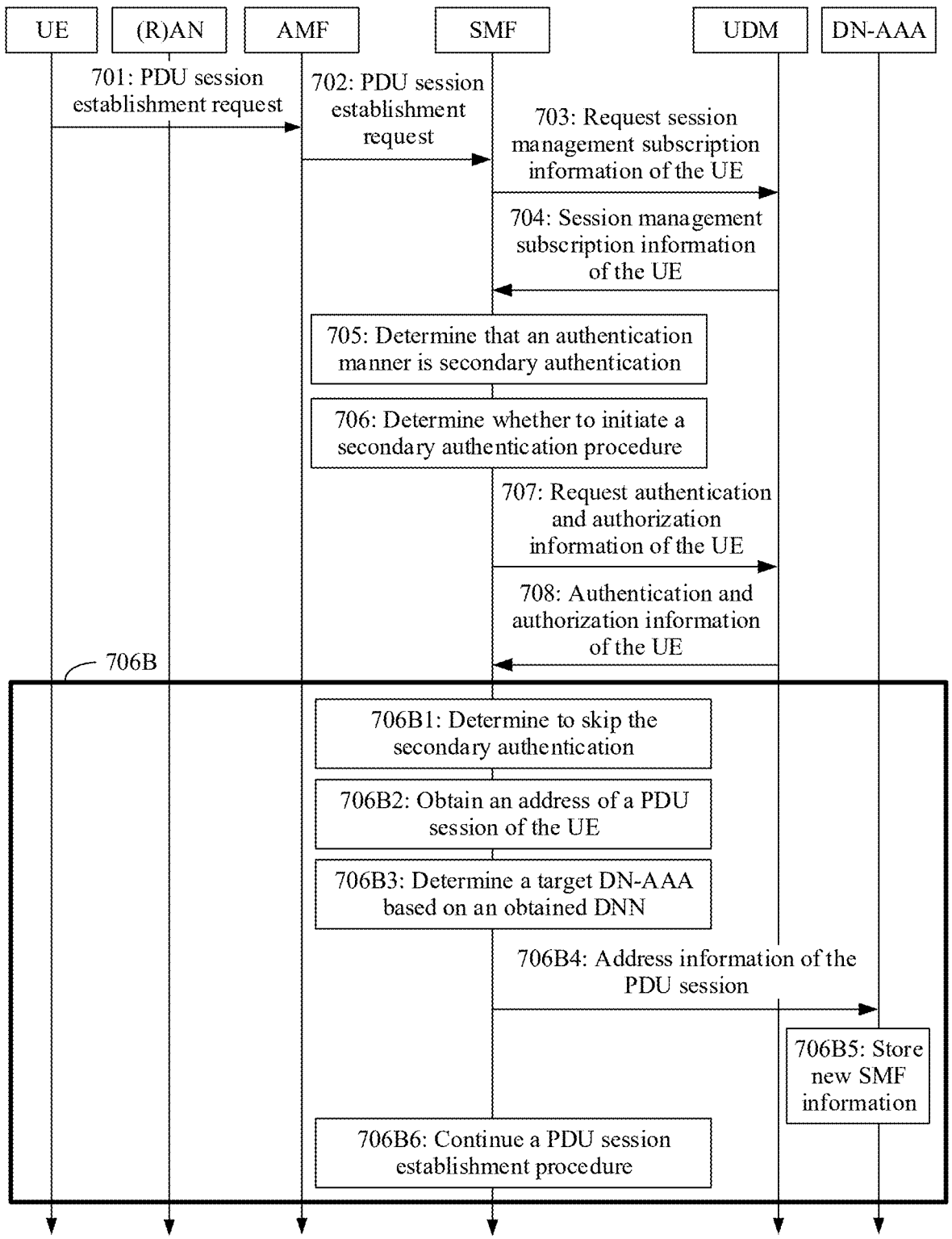
Figure 10:
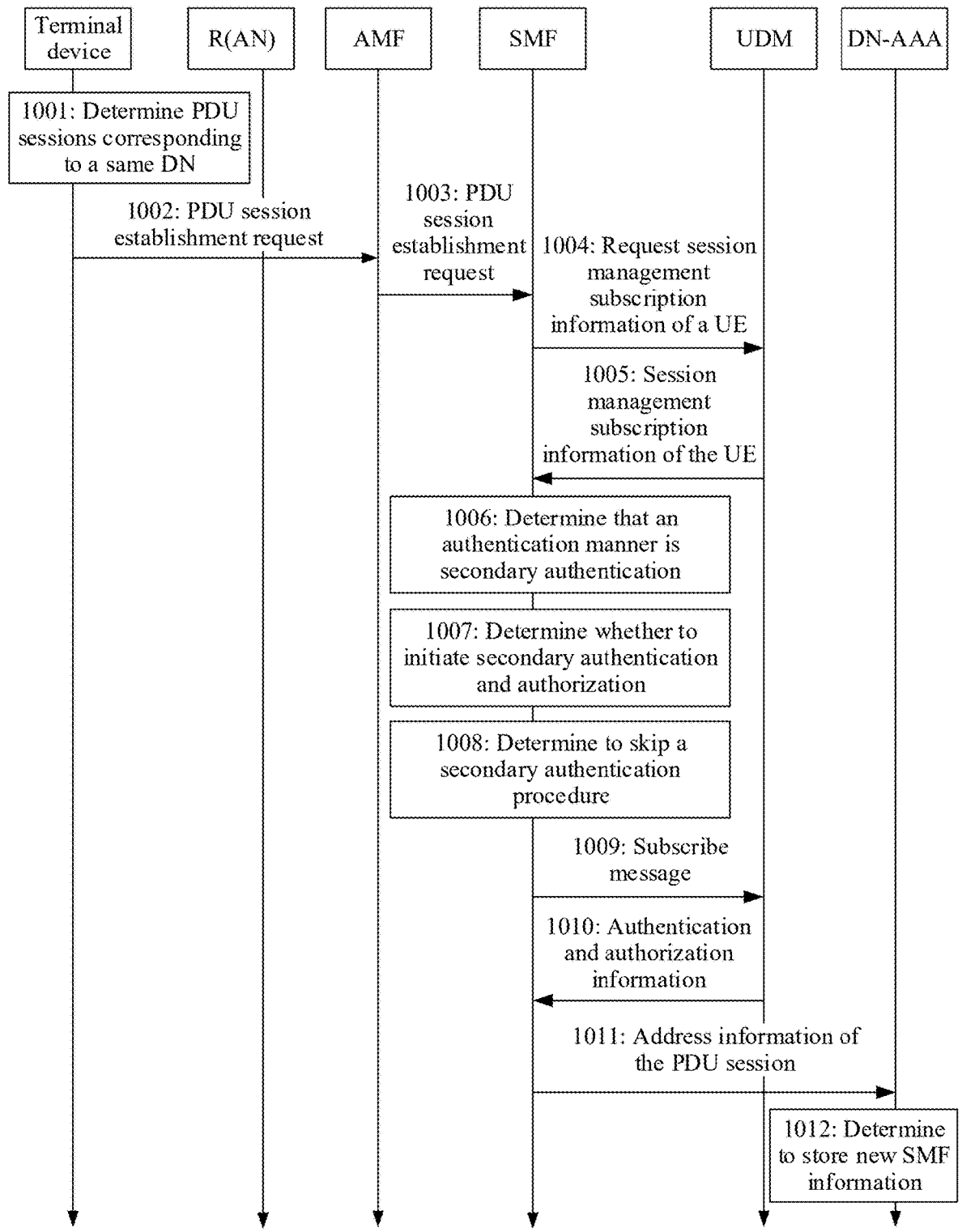
FIG. 10 is a schematic diagram of an authentication and authorization method applicable to yet another embodiment of this disclosure.

The following describes, with reference to specific embodiments in FIG. 7(1) and FIG. 7(2) to FIG. 10, a possible complete procedure in which the SMF obtains the authentication and authorization information.

Implementation 2: The SMF may determine, based on the indication information #1, whether the authentication result exists.

It should be understood that, for differentiation and without loss of generality, in this embodiment of this disclosure, the indication information #1 is information used to determine whether the authentication result exists.

For example, the indication information #1 is from the terminal device.

The terminal device sends the indication information #1 to the SMF, so that the SMF determines, based on the indication information #1, whether the authentication result exists. The indication information #1 may be sent to the SMF by using separate signaling, or may be carried in the session establishment request message. This is not limited.

In a possible case, the indication information #1 may be sent before whether the authentication result exists is determined. For example, the SMF determines that no authentication result exists, and sends an EAP message to the terminal device after initiating the secondary authentication procedure for the session #1, and the terminal device sends the indication information #1 after receiving the EAP message. For another example, after the SMF determines that no authentication result exists and before the SMF initiates the secondary authentication procedure for the session #1, the terminal device sends the indication information #1 to the SMF.

In another possible case, the indication information #1 may be sent before whether the authentication result exists is determined. For example, when initiating the session establishment request, the terminal device may first determine whether the authentication result exists or whether secondary authentication is being performed. If the authentication result exists or secondary authentication is being performed, the terminal device sends the indication information #1. In this case, the SMF may not need to determine whether the authentication result exists, but may directly determine, based on the indication information #1, whether the authentication result exists or whether to suspend the session #1.

A form of the indication information #1 is not limited.

In a possible form, the indication information #1 may be embodied as a session identifier.

For example, when establishing the session #1, the terminal device also includes a session identifier (for example, a session ID) of another session (for example, denoted as a session #2). In this indication manner, the session #1 and the session #2 are redundant for each other, that is, are connected to the same DN. For the session #1, the SMF may further determine that secondary authentication does not need to be initiated, or reuse an authentication and authorization result for the another session #2. For example, in a possible scenario, in a URLLC scenario, the session #1 indicated by indication information #1 sent by the terminal device is a redundant session. In the scenario, the SMF does not need to perform secondary authentication, and the SMF may obtain a result based on the indication information #1. In other words, when the SMF needs to initiate the secondary authentication, the SMF always initiates the secondary authentication for the another session (for example, the session #2), and directly skips the secondary authentication for the session #1.

In another possible form, the indication information #1 may be embodied as a DNN.

For example, when establishing the session #1, the terminal device also includes a DNN of another session (for example, denoted as a session #2). In this indication manner, the session #1 is a session that corresponds to the same DN and that uses a DNN different from a previous DNN. For the session #1, the SMF may further determine that secondary authentication does not need to be initiated, or reuse an authentication and authorization result for the another session #2.

In another possible form, the indication information #1 may be embodied by adding a new field or reusing an existing field.

For example, when establishing the session #1, the terminal device determines whether the session #1 is a session of the same data network, to be specific, whether the data network #1 is the same as a data network of a previously established session. For example, if a value of the newly added field or the existing field is "0", it indicates that the data network #1 is different from the data network of the previously established session, and for the session #1, the SMF may initiate the secondary authentication; or if a value of the newly added field or the existing field is "1", it indicates that the data network #1 is the same as the data network of the previously established session, and for the session #1, the SMF may further determine that the secondary authentication does not need to be initiated, or reuse an authentication and authorization result for another session #2.

Therefore, the terminal device sends the indication information to the SMF, so that the SMF perceives that sessions that use different DNNs have been established. Therefore, the SMF may identify sessions using different DNNs to access the same data network, so that signaling overheads caused by repeatedly performing the secondary authentication procedure are avoided.

In another example, the indication information #1 is from the authentication server of the data network #1.

The authentication server of the data network #1 sends the indication information #1 to the SMF, so that the SMF determines, based on the indication information #1, whether the authentication result exists.

During session establishment, the authentication server of the data network #1 determines whether the authentication server of the data network #1 has authenticated the terminal device, and may directly send the authentication and authorization result to the SMF. Therefore, the authentication server of the data network may determine to reuse the secondary authentication result, so that signaling overheads caused by repeatedly performing the secondary authentication procedure are avoided.

The foregoing Aspect 1 mainly describes the manners in which the SMF determines whether the authentication result exists, and the following describes, with reference to Aspect 2, a solution in which secondary authentication is being performed.

Aspect 2: The SMF determines that secondary authentication is being performed.

For a same data network, one terminal device may establish two or more sessions, and the two or more sessions may be simultaneously established, or may be established at different time points as required. In this case, when the terminal device initiates an establishment request for the session #1, secondary authentication may be being performed.

For example, after the terminal device initiates the session establishment request for the session #1 and the SMF determines that no authentication result exists, the secondary authentication procedure for the session #1 may be initiated, or whether secondary authentication is being performed currently may be determined. For another example, before determining whether the authentication result exists, the SMF has determined whether secondary authentication is being performed currently. If determining that secondary authentication is being performed, for example, secondary authentication for the session #2 is being performed, the SMF suspends the session #1.

The SMF determines, based on an authentication and authorization result for the session #2, whether to continue to establish the session #1 or reject establishment of the session #1.

In a possible case, the authentication and authorization result indicates that the secondary authentication for the session #2 succeeds. The authentication and authorization result may further include authentication and authorization information. In this case, the SMF determines, based on the authentication and authorization result, to continue to establish the session #1, does not need to perform the secondary authentication procedure again (in other words, skips the secondary authentication procedure), and continues to establish the session #1 based on the authentication and authorization information.

In another possible case, the authentication and authorization result indicates that the secondary authentication for the session #2 fails. In this case, the SMF may determine, based on the authentication and authorization result, to reject establishment of the session #1, in other words, to terminate establishment of the session #1. Alternatively, the SMF may determine, based on a failure reason of the authentication and authorization, whether to terminate the establishment of the session #1.

Optionally, the SMF may determine, based on feedback from the authentication server of the data network, that the secondary authentication for the session #2 succeeds or fails.

For example, the SMF may determine subsequent processing depending on whether the feedback from the authentication server of the data network, for example, the authentication result for the session #2, is received after preset duration. The preset duration may be pre-specified duration, for example, is predefined in a protocol; or may be duration determined based on a historical communication status.

For example, the preset duration may be implemented by using a timer. For example, after suspending the session #1, the SMF activates the timer by using the preset duration as a time length. If no authentication result for the session #2 is received before the timer expires, the SMF determines that the secondary authentication for the session #2 fails, and terminates the establishment of the session #1.

In a possible implementation, the SMF may determine, based on indication information #2, that secondary authentication is being performed.

It should be understood that, for differentiation and without loss of generality, in this embodiment of this disclosure, the indication information #2 is information indicating that secondary authentication is being performed.

For example, the indication information #2 is from the terminal device.

The terminal device sends the indication information #2 to the SMF, so that the SMF suspends the session #1 based on the indication information #2. The indication information #2 may be sent to the SMF by using separate signaling, or may be carried in the session establishment request message. This is not limited.

For example, before sending the session establishment request message, the terminal device may first determine that the secondary authentication procedure is being performed for a session (for example, denoted as the session #2) corresponding to a same data network (namely, the data network #1). Therefore, the terminal device sends the indication information #2 to the SMF, so that the SMF suspends the session #1. In this case, the SMF may not determine whether the authentication result exists, but determines, based on an indication of the terminal device, that the secondary authentication procedure does not need to be initiated.

For another example, the terminal device simultaneously initiates two sessions (the session #1 and the session #3). The session establishment request of the session #1 includes the indication information #2. When receiving the indication information #2, the SMF may directly skip the secondary authentication procedure based on the indication information #2, and suspend the session #1. In this case, the SMF and another SMF have not received a request for establishing another session (namely, the session #3) or have simultaneously received a request for establishing the session #3. However, the SMF may directly skip the secondary authentication procedure based on indication information, so that secondary authentication can also be prevented from being repeatedly performed.

For another example, after the SMF determines that no authentication result exists and determines to initiate the secondary authentication procedure for the session #1, the terminal device sends the indication information #2 to the SMF in the secondary authentication procedure, so that the SMF suspends the session #1 based on the indication information #2.

In another example, the indication information #2 is from the authentication server of the data network #1.

The authentication server of the data network #1 sends the indication information #2 to the SMF, so that the SMF determines that secondary authentication is being performed, and suspends the session #1.

During session establishment, the authentication server of the data network #1 determines whether the terminal device is being authenticated.

It should be understood that, that the SMF determines, based on the indication information #2, that secondary authentication is being performed is merely an example for description. This is not limited. For example, the SMF may alternatively autonomously determine whether secondary authentication is being performed.

Optionally, in Aspect 2, the SMF may alternatively determine, based on indication information #4, whether to determine, based on a result of secondary authentication that is being performed, whether to continue to perform an establishment procedure for the session #1. It should be understood that, for differentiation and without loss of generality, in this embodiment of this disclosure, the indication information #4 is information used to determine, based on the result of secondary authentication that is being performed, whether to continue to perform the establishment procedure for the session #1. For details, refer to the following descriptions in FIG. 8A and FIG. 8B.

The solutions described in Aspect 1 and Aspect 2 may be used independently, or may be used in combination. For example, the SMF determines, according to the solution in Aspect 1, whether the authentication result exists, and when determining that no authentication result exists, determines, according to the solution in Aspect 2, whether secondary authentication is being performed. For another example, the SMF may first determine, according to the solution in Aspect 2, whether secondary authentication is being performed, and when determining that secondary authentication is being performed, directly suspend the session.

The following describes, with reference to Aspect 3, a solution for storing the authentication and authorization result and/or the authentication and authorization information.

Aspect 3: The SMF determines whether to store the authentication result. The authentication result includes, for example, an authentication and authorization result (for example, indicating that authentication succeeds or fails) and/or authentication and authorization information.

Implementation 1: The SMF may determine, based on indication information #3, whether to store the authentication result.

It should be understood that, for differentiation and without loss of generality, in this embodiment of this disclosure, the indication information #3 is information used to determine whether to store the authentication result.

For example, if the indication information #3 indicates that the authentication result can be reused, or the indication information #3 indicates the SMF to store the authentication result, the SMF determines, based on the indication information #3, to store the authentication and authorization information. If the indication information #3 indicates that the authentication result cannot be reused, or the indication information #3 indicates the SMF not to store the authentication result, the SMF determines, based on the indication information #3, not to store the authentication and authorization information.

For example, the indication information #3 is from the terminal device.

The terminal device sends the indication information #3 to the SMF, so that the SMF determines, based on the indication information #3, whether to store the authentication result. The indication information #3 may be sent to the SMF by using separate signaling, or may be carried in the session establishment request message. This is not limited.

In another example, the indication information #3 is from the authentication server of the data network #1.

The authentication server of the data network #1 sends the indication information #3 to the SMF, so that the SMF determines, based on the indication information #3, whether to store the authentication result.

Implementation 2: The SMF may determine, based on a session attribute and/or a local policy, whether to store the authentication result.

The local policy, for example, may represent a pre-specified requirement, for example, pre-specifies that the authentication result is to be stored or pre-specifies that the authentication result is not to be stored.

For example, the session attribute may include but is not limited to, attributes such as a session type (type) (such as an IP type, an Ethernet type, or an unstructured type), a session and service continuity mode, user plane security management information, a multi-access PDU connectivity service (multi-access PDU connectivity service), and a high-reliability type. For example, for the multi-access PDU connectivity service, the SMF stores the authentication result.

Resource and space utilization can be improved by selectively storing the authentication result. It should be understood that the foregoing is merely an example for description, and this is not limited. For example, it may alternatively be pre-specified, for example, be defined in a protocol, that the authentication result of the secondary authentication is to be stored, for example, the authentication result of the secondary authentication is to be stored for specific duration.

Optionally, when determining to store the authentication result, the SMF may store the authentication result for specific duration, for example, storage duration or a validity period. After the storage duration expires, the authentication result may be deleted, so that higher security is ensured. The storage duration may be predefined, or may be provided by the authentication network element of the data network. This is not limited.

The solutions described in the foregoing aspects may be used independently, or may be used in combination. For example, the SMF determines, according to the solution in Aspect 1, whether the authentication result exists, and when no authentication result exists, then determines, according to the solution in Aspect 2, that secondary authentication is being performed, and may determine, according to the solution in Aspect 3, whether to store the authentication result.

The foregoing briefly describes embodiments of this disclosure with reference to the three aspects. The following describes several embodiments applicable to this disclosure with reference to possible complete procedures shown in FIG. 7(1) and FIG. 7(2) to FIG. 10 by using an example in which the authentication server of the data network is a DN-AAA and the session is a PDU session.

FIG. 7(1) and FIG. 7(2) are schematic interaction diagrams of a method 700 applicable to an embodiment of this disclosure. The method 700 mainly describes the foregoing solution in which the SMF determines, based on the authorization information, whether the authentication result exists.

The method 700 may include the following steps.

701: A terminal device initiates a PDU session establishment request to an AMF.

The terminal device may send a NAS message to the AMF by using an access network (an AN or a RAN), where the NAS message includes the PDU session establishment request. For example, the NAS message includes single network slice selection assistance information (Single Network Slice Selection Assistance Information, S-NSSAI) and session management (session management, SM) (N1 SM) information, and the N1 SM information includes the session establishment request. A PDU connectivity service, namely, a service of exchanging a PDU data packet between the terminal device and a DN, can be implemented by initiating establishment of a PDU session by the terminal device. After one PDU session is established, a data transmission channel between one terminal device and the DN is established.

For example, the NAS message may further carry a DNN, indicating a DN that the terminal device intends to access.

702: The AMF sends the PDU session establishment request to an SMF.

For example, the AMF may send an $N_{smf}$ interface PDU session establishment session management context request ($N_{smf}$_PDUSession_CreateSMContext Request) message to the SMF, where the message includes the PDU session establishment request. Optionally, the message may further include a DNN, indicating a DN that the terminal device intends to access.

It should be understood that the $N_{smf}$ PDUSession_CreateSMContext Request message is merely an example for description, and this is not limited. Provided that the AMF can send the PDU session establishment request to the SMF, it is feasible that the PDU session establishment request is carried in any message.

After receiving the PDU session establishment request, the SMF may first obtain session management subscription of the terminal device. For example, the session management subscription may be obtained locally, or may be obtained from a UDM. For ease of description, FIG. 7(1) and FIG. 7(2) show only a case in which the session management subscription is obtained from the UDM. It should be understood that any solution in which the SMF may obtain the session management subscription of the terminal device is applicable to this embodiment of this disclosure.

703: The SMF requests session management subscription information of the terminal device from a UDM.

For example, the SMF may send an $N_{udm}$ interface session management subscription get ($N_{udm}$_SDM_Get) message to the UDM, to request the session management subscription information of the terminal device.

It should be understood that the $N_{udm}$_SDM_Get message is merely an example for description, and this is not limited. Provided that the SMF may request the session management subscription information of the terminal device from the UDM, it is feasible that the request is carried in any message.

704: The UDM sends session management subscription information of the terminal device to the SMF.

For example, the UDM may send an $N_{udm}$ interface session management subscription get response ($N_{udm}$_SDM_Get response) message to the SMF, where the response message includes the session management subscription information of the terminal device.

It should be understood that the $N_{udm}$_SDM_Get response message is merely an example for description, and this is not limited. Provided that the UDM may send the session management subscription information of the terminal device to the SMF, it is feasible that the session management subscription information is carried in any message.

After obtaining the session management subscription information of the terminal device, the SMF may determine whether secondary authentication and authorization need to be performed for the PDU session. It is assumed that the SMF determines that the PDU session requires the secondary authentication and authorization.

705: The SMF determines that an authentication manner is secondary authentication.

In other words, the SMF determines that the PDU session requires the secondary authentication and authorization. It may be understood that the SMF determines that terminal device requires secondary authentication with the DN. Before initiating a secondary authentication procedure, the SMF may determine whether the terminal device has performed secondary authentication with the DN (that is, whether an authentication result exists), to determine whether to initiate the secondary authentication.

706: The SMF determines whether to initiate a secondary authentication procedure.

Optionally, step 705 and step 706 may alternatively be combined. To be specific, the step of determining that an authentication manner is secondary authentication and the step of determining whether to initiate a secondary authentication procedure are a same step. Alternatively, it may be understood as that when the authentication manner is the secondary authentication, whether to initiate the secondary authentication procedure needs to be determined by default.

For example, whether to initiate the secondary authentication procedure may be determined based on Implementation 1 in Aspect 1 in the method 600. The following briefly describes two solutions.

Solution 1: The SMF determines, based on UE context information, whether to initiate the secondary authentication procedure.

If a context of the UE exists on the SMF, the SMF may determine, based on the context of the UE, whether to initiate the secondary authentication procedure. If determining, based on the context of the UE, to perform secondary authentication, the SMF performs step 706A in FIG. 7(1). If determining, based on the context of the UE, to skip the secondary authentication procedure (or not to initiate the secondary authentication procedure), the SMF performs step 706B in FIG. 7(2).

Specifically, the SMF may determine, depending on whether the context of the UE includes authentication and authorization information corresponding to the DNN or the authentication and authorization information of the DN indicated by the DNN, whether to perform secondary authentication.

The authentication and authorization information may include a DNN, and the DNN is used to identify a DN. Whether a same DN is identified is determined by comparing the DNN with the DNN received from the AMF. The authentication and authorization information may further include PDU session management and control related information. Optionally, the authentication and authorization information may further include but is not limited to one or more of the following: a DN-specific Id, a DN-AAA Id, validity information, an index (index) of a text authorized by the DN, a session-aggregate maximum bit rate AMBR authorized by the DN, an allowed MAC address(es), an allowed virtual local area network identifier (VIDs), and a PDU session information reporting indication. The PDU session information reporting indication indicates to report related information of the PDU session, for example, address information of the PDU session.

When the DNN included in the authentication and authorization information is the same as the DNN received from the AMF, a same DN is indicated, in other words, secondary authentication does not need to be performed. When the DNN included in the authentication and authorization information is different from the DNN received from the AMF, whether the DNN included in the authentication and authorization information and the DNN received from the AMF are equivalent DNNs, in other words, whether a same DN is indicated, may be determined. The equivalent DNN is a DNN that identifies the same DN.

For example, a plurality of DNNs (or one DNN list) (namely, equivalent DNNs) may be preconfigured to indicate the same DN. For example, the session management subscription information of the terminal device sent by the UDM to the SMF includes the plurality of DNNs. For another example, the plurality of DNNs may be locally stored by the SMF or be from the authentication and authorization information obtained from the UDM.

For example, the DNN received from the AMF is a DNN 1, and the plurality of DNNs (namely, the equivalent DNNs) in the authentication and authorization information include {DNN 1, DNN 2, and DNN 3}. In this case, it indicates that the DN that has performed authentication and authorization and the DN that the terminal device requests to access are the same DN. In other words, the terminal device has previously been authenticated with the DN that the terminal device requests to access, and the secondary authentication procedure does not need to be performed again. In this case, the SMF may perform step 706B in FIG. 7(2).

For another example, the DNN received from the AMF is a DNN 5, and the plurality of DNNs (namely, the equivalent DNNs) in the authentication and authorization information include {DNN 1, DNN 2, and DNN 3}. In this case, it indicates that the DN that has performed authentication and authorization and the DN that the terminal device requests to access are different DNs. In other words, the terminal device has not been authenticated with the DN that the terminal device requests to access, and the secondary authentication procedure needs to be performed. In this case, the SMF may perform step 706A in FIG. 7(1).

Based on the foregoing Solution 1, the SMF may determine, based on the locally stored context of the UE, whether to initiate the secondary authentication procedure. The solution is simple and easy to implement.

Solution 2: The SMF determines, based on obtained authentication and authorization information, whether to initiate the secondary authentication procedure.

Optionally, if no context of the UE exists on the SMF, the SMF may request the authentication and authorization information of the terminal device from the UDM. That is, the SMF may perform steps 707 and 708. The SMF may request, from the UDM, the authentication and authorization information of the terminal device, or historical secondary authentication and authorization information, namely, related information used by the terminal device to perform secondary authentication and authorization before. Therefore, the SMF may determine, based on the obtained authentication and authorization information, whether to initiate the secondary authentication procedure.

707: The SMF requests authentication and authorization information of the terminal device from the UDM.

For example, the SMF may send an $N_{udm}$_UE_Get message to the UDM, to request the authentication and authorization information of the terminal device. Optionally, the $N_{udm}$_UE_Get message may further include DNN information.

It should be understood that the $N_{udm}$_UE_Get message is merely an example for description, and this is not limited.

Optionally, step 707 and step 703 may alternatively be combined for processing. To be specific, when requesting the session management subscription information of the UE, the SMF may also request the authentication and authorization information of the UE.

708: The UDM sends the authentication and authorization information of the terminal device to the SMF.

Optionally, step 708 and step 704 may alternatively be combined for processing. To be specific, when sending the session management subscription information of the UE, the UDM may also send the authentication and authorization information of the UE.

In one case, the UDM stores the authentication and authorization information of the terminal device. For example, the UDM may send an $N_{udm}$_UE_Getresponse message to the SMF, where the message includes the authentication and authorization information of the terminal device. Optionally, the UDM includes DNN information equivalent to a DNN in the authentication and authorization information.

If the request message used by the SMF to request the authentication and authorization information of the terminal device from the UDM includes the DNN information, the authentication and authorization information of the UE obtained by the SMF is authentication and authorization information of a data network corresponding to the DNN. DNN list information of the DN may be configured in the UDM, in other words, a plurality of DNNs (namely, equivalent DNNs) may indicate a same DN. Optionally, the authentication and authorization information sent by the UDM to the SMF carries one or more DNNs equivalent to the DNN.

The SMF determines, based on the authentication and authorization information in the response message, whether to initiate the secondary authentication procedure. If determining, based on the authentication and authorization information in the response message, to perform secondary authentication, the SMF performs step 706A in FIG. 7(1). If determining, based on the authentication and authorization information in the response message, to skip the secondary authentication procedure, the SMF performs step 706B in FIG. 7(2). For content of the authentication and authorization information and a determining manner of the SMF, refer to descriptions in Solution 1. Details are not described herein again.

In another case, the UDM does not store the authentication and authorization information of the terminal device. For example, the UDM may send an $N_{udm}$_UE_Get response message to the SMF, where the message does not include the authentication and authorization information of the terminal device. Alternatively, the UDM may alternatively not send a message to the SMF. After the SMF receives no response from the UDM (for example, receives no response from the UDM after preset duration), there is no authentication and authorization information of the terminal device by default. In this case, the SMF may determine to initiate the secondary authentication procedure, that is, perform step 706A.

It should be understood that step 707 and step 708 are merely examples for description. Optionally, the SMF may alternatively locally store the authentication and authorization information. In this case, the SMF may not need to request the authentication and authorization information from the UDM, that is, step 707 and step 708 may not need to be performed.

The following describes step 706A in FIG. 7(1) and step 706B in FIG. 7(2).

Step 706A: Perform the secondary authentication procedure. As shown in FIG. 7(1), after the SMF determines to initiate the secondary authentication procedure, the method 700 may include steps 706A1 to 706A7.

706A1: The SMF determines to initiate the secondary authentication procedure.

It may be understood that the SMF triggers the secondary authentication procedure. 706A2: Perform secondary authentication and authorization between the terminal device and a DN-AAA.

The DN-AAA performs authentication and/or authorization on the terminal device. The terminal device and the DN-AAA may exchange EAP messages for one or more times, to complete authentication of the DN-AAA on the terminal device. For a process of performing secondary authentication between the terminal device and the DN-AAA, refer to an existing procedure of the secondary authentication, for example, the foregoing descriptions of 206 to 212. This is not limited.

If successfully authenticating the terminal device, the DN-AAA may send an authentication success message to the SMF.

706A3: The DN-AAA sends an authentication success message to the SMF.

The authentication success message or the authentication result indicates that secondary authentication for another PDU session succeeds. The authentication success message may include the authentication and authorization information. Optionally, the authentication success message may include indication information #3, and the indication information #3 indicates whether the authentication result can be reused, or the indication information #3 indicates whether the SMF needs to store the authentication result.

706A4: The SMF stores the authentication and authorization information.

In an example, the SMF determines, based on the indication information #3, whether to store the authentication and authorization information.

If the indication information #3 indicates that the authentication result can be reused, or the indication information #3 indicates the SMF to store the authentication result, the SMF determines, based on the indication information #3, to store the authentication and authorization information. If the indication information #3 indicates that the authentication result cannot be reused, or the indication information #3 indicates the SMF not to store the authentication result, the SMF determines, based on the indication information #3, not to store the authentication and authorization information.

In another example, the SMF determines, based on a local policy or a PDU session attribute, whether to store the authentication and authorization information.

The local policy, for example, may represent a pre-specified requirement, for example, pre-specifies that the authentication and authorization information is to be stored or pre-specifies that the authentication and authorization information is not to be stored.

For example, the PDU session attribute may include but is not limited to, attributes such as a PDU session type (type) (such as an IP type, an Ethernet type, or an unstructured type), a session and service continuity mode, user plane security management information, a multi-access PDU connectivity service (multi-access PDU connectivity service), and a high-reliability type. For example, for the multi-access PDU connectivity service, the SMF stores the authentication and authorization information.

In another example, the SMF determines, depending on whether the indication information #3 is received, whether to store the authentication and authorization information. If the SMF receives, from the DN-AAA, indication information #3 indicating that the authentication result can be reused or indicating that the authentication result is stored, the SMF determines to store the authentication and authorization information. If the SMF does not receive the indication information #3 from the DN-AAA, the SMF determines not to store the authentication and authorization information.

It should be understood that the foregoing examples are merely examples for description. This is not limited in this disclosure. For example, the SMF may directly store the authentication and authorization information by default.

706A5: The SMF sends the authentication and authorization information to the UDM.

For example, the SMF may send an $N_{udm}$ interface session management subscription update ($N_{udm}$_SDM_Update) message to the UDM, where the message includes the authentication and authorization information for the secondary authentication. For example, the authentication and authorization information may include but is not limited to, a DN-specific Id, a DNN, a DN-AAAId, validity information, an index of a text authorized by the DN, a session-AMBR authorized by the DN, an allowed MAC address(s), an allowed VID(s), and a PDU session information reporting indication.

It should be understood that the $N_{udm}$_SDM_Update message is merely an example for description, and this is not limited. Provided that the SMF may send the authentication and authorization information to the UDM, it is feasible that the authentication and authorization information is carried in any message.

706A6: The UDM sends a response message to the SMF.

The UDM sends a response message of the authentication and authorization information to the SMF. For example, the SMF receives an $N_{udm}$_SDM_Update response ($N_{udm}$_SDM_Updateresponse) message sent by the UDM.

706A7: The SMF continues a PDU session establishment procedure.

After authentication performed by the DN-AAA on the terminal device ends, the SMF may continue to initiate another procedure of the PDU session establishment. For example, the another procedure of the PDU session establishment may include but is not limited to: the SMF sending an N4 interface session establishment/modification request to the UPF, and the UPF feeding back an N4 interface session establishment/modification response to the SMF. The SMF may further send a PDU session establishment success message to the terminal device by using the AMF.

It should be understood that the foregoing is merely a simple example for description. For a specific secondary authentication and authorization process, refer to an existing solution. This is not limited in this embodiment of this disclosure.

Step 706B: Skip performing the secondary authentication procedure. As shown in FIG. 7(2), when the SMF determines to skip the secondary authentication procedure, the method 700 may include steps 706B1 to 706B6.

706B1: The SMF determines to skip the secondary authentication.

For example, in this case, step 706A2 in FIG. 7(1) does not need to be performed.

706B2: The SMF determines to obtain an address of a PDU session of the terminal device.

The SMF performs the PDU session establishment procedure based on the obtained authentication and authorization information. For example, the authentication and authorization information may be obtained by the SMF from the context of the UE, or may be obtained by the SMF from the UDM, or may be locally stored by the SMF. For details, refer to the foregoing descriptions.

If the SMF receives authorization information used for PDU session control, for example, the authorization information may include but is not limited to, an index of a text authorized by the DN, a session-AMBR authorized by the DN, an allowed MAC address(s), an allowed VID(s), and a PDU session information reporting indication. The SMF performs the PDU session establishment procedure by using the authorization information. For example, the SMF may send the index of the text authorized by the DN and the session-AMBR authorized by the DN to the PCF, and determine the address of the PDU session based on the allowed MAC address(s) and the allowed VID(s).

706B3: The SMF determines a target DN-AAA based on an obtained DNN or the authentication and authorization information.

For example, the SMF determines the target DN-AAA based on the authentication and authorization information. In a possible implementation, the authentication result stores a DN-AAA address, so that the DN-AAA may be determined based on the authentication result. In another possible implementation, the authentication result includes a DN-specific Id, and the DN-AAA address is determined based on the DN-specific Id.

It should be understood that any manner in which the SMF may determine the target DN-AAA is applicable to this embodiment of this disclosure.

706B4: The SMF reports address information of the PDU session to the target DN-AAA.

For example, the address information of the PDU session may include but is not limited to, an IP address, a MAC address, or VIDs.

In an example, the SMF may report the address information of the PDU session based on an indication of the DN-AAA. For example, the SMF may determine, based on the PDU session information reporting indication in the authentication and authorization information, to notify the DN-AAA of the address information of the PDU session.

In another example, the SMF may determine, based on a local configuration (for example, a requirement that the address information of the PDU session needs to be notified is locally configured), to notify the DN-AAA of the address information of the PDU session.

Optionally, the SMF may further include a generic public subscription identifier (Generic Public Subscription Identifier, GPSI) of the terminal device.

706B5: The DN-AAA stores new information of the SMF.

The DN-AAA may determine to store the new information about the SMF, in other words, maintain a session between the DN-AAA and the SMF, for subsequent interaction between the DN-AAA and the SMF.

706B6: The SMF continues a PDU session establishment procedure.

For example, the SMF continues to perform the PDU session establishment procedure. The PDU session establishment procedure may include but is not limited to: the SMF sending an N4 interface session establishment/modification request to the UPF, and the UPF feeding back an N4 interface session establishment/modification response to the SMF.

It should be understood that sequence numbers of the steps do not mean execution sequences, and the execution sequences of the processes should be determined based on functions and internal logic of the processes. For example, step 706B4 may alternatively occur after the PDU session establishment is completed, that is, after step 706B6. For another example, step 706 and step 705 may be combined. To be specific, the step of determining that an authentication manner is secondary authentication and the step of determining whether to initiate a secondary authentication procedure are a same step.

The foregoing describes an embodiment with reference to the method 700 shown in FIG. 7(1) and FIG. 7(2). According to this embodiment, during PDU session establishment, the SMF may determine, based on the context of the UE, the authentication and authorization information obtained from the UDM, or the locally stored authentication and authorization information, whether to initiate the secondary authentication procedure. The authentication and authorization information further includes PDU session management and control related information, so that when the secondary authentication procedure is skipped, the PDU session may be directly established based on the authentication and authorization information. In addition, the authentication and authorization information may further include a plurality of pieces of DNN information (namely, equivalent DNNs) used to identify the same DN, so that it can be ensured that in a scenario in which different DNNs are used to identify the DN, the secondary authentication procedure can also be prevented from being repeatedly performed. Accordingly, it can be ensured that even if different DNNs are used to access the DN, the SMF can also prevent the secondary authentication procedure as much as possible from being repeatedly performed. In addition, the stored authorization information is enhanced, so that it is ensured that the control information of the PDU session can also be used.

Figure 8A:
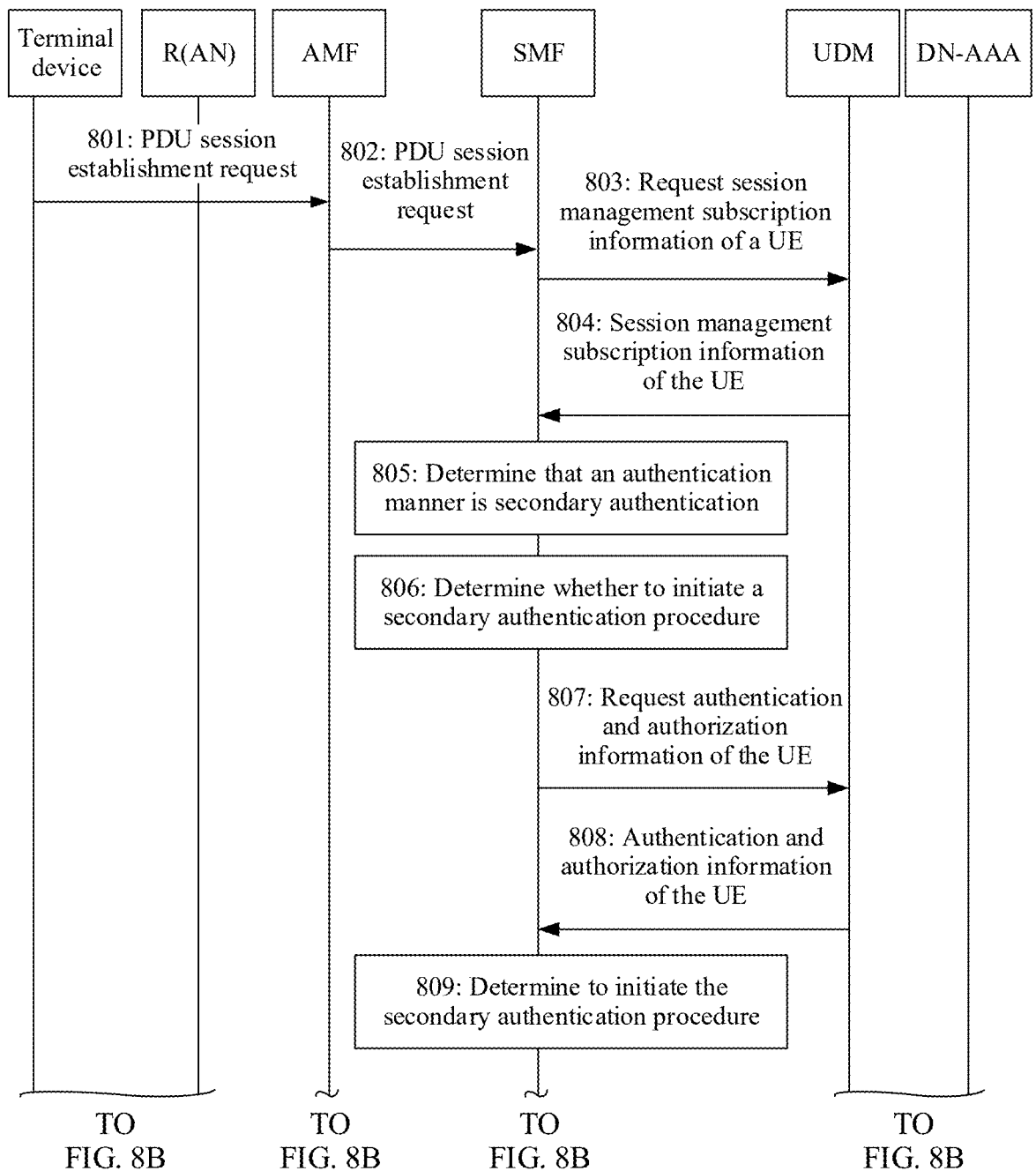
FIG. 8A and FIG. 8B are a schematic diagram of an authentication and authorization method applicable to another embodiment of this disclosure.
Figure 8B:
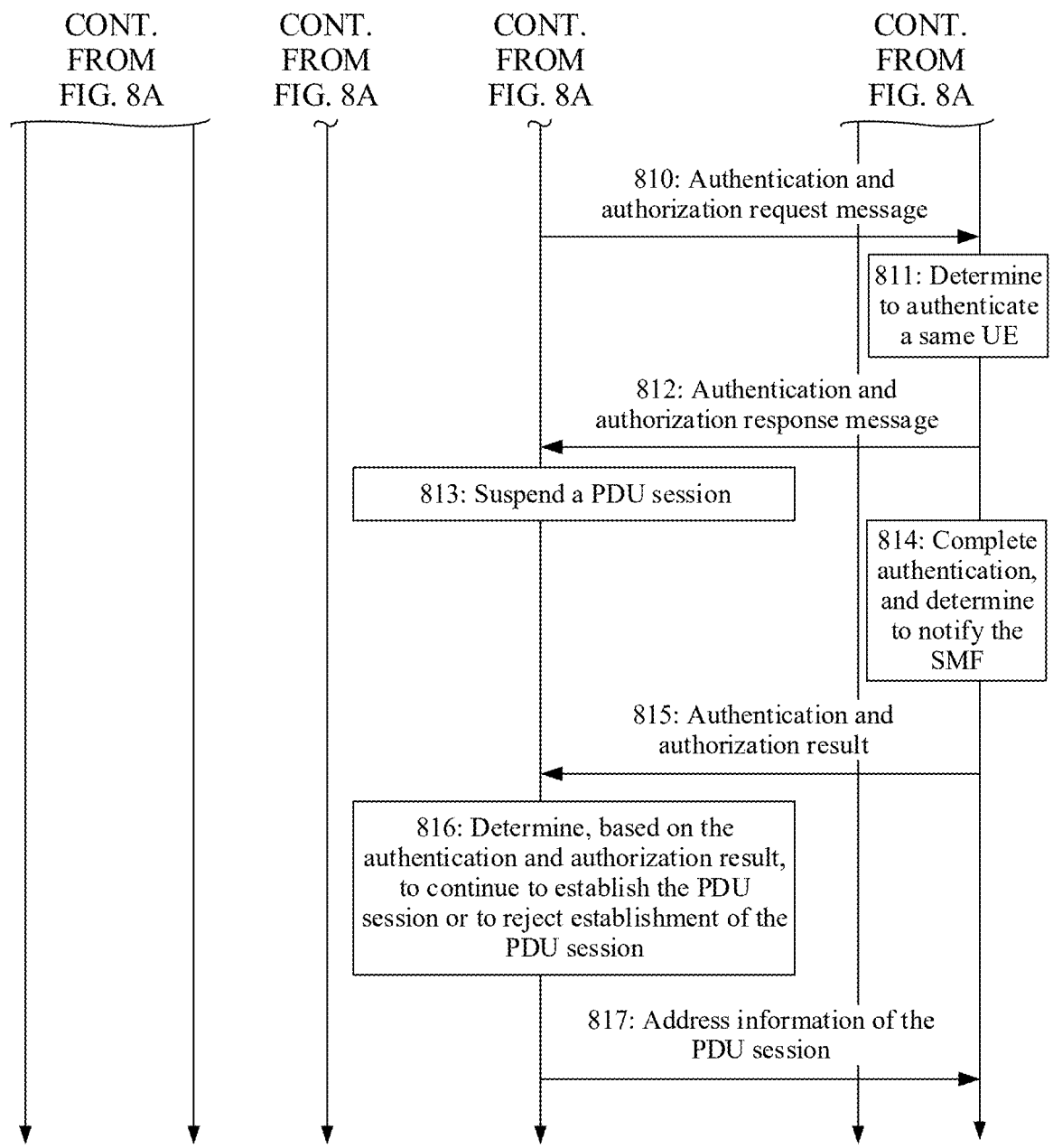

FIG. 8A and FIG. 8B are a schematic interaction diagram of a method 800 applicable to another embodiment of this disclosure. The method 800 mainly describes the foregoing solution in which the secondary authentication is being performed. In the method 800, after the SMF determines, depending on whether the authentication result exists, to initiate a secondary authentication procedure, the authentication server of the DN may indicate the SMF to suspend a session.

The method 800 may include the following steps.

801: A terminal device initiates a PDU session establishment request to an AMF.

For example, the terminal device sends a NAS message to the AMF. The NAS message may further include a DNN, indicating a DN that the terminal device intends to access.

It should be understood that a specific process of step 801 is similar to that of step 701 in the foregoing method 700. Because step 701 is described in detail in the foregoing method 700, for brevity, details are not described herein again.

Different from step 701, in step 801, the terminal device may further send authentication and authorization information corresponding to the DN, for example, the authentication and authorization information that corresponds to the DN and that is included in the PDU session establishment request, or may separately send the authentication and authorization information corresponding to the DN to the AMF.

802: The AMF sends the PDU session establishment request to an SMF.

It should be understood that a specific process of step 802 is similar to that of step 702 in the foregoing method 700. Because step 702 is described in detail in the foregoing method 700, for brevity, details are not described herein again.

803: The SMF requests session management subscription information of the terminal device from a UDM.

It should be understood that a specific process of step 803 is similar to that of step 703 in the foregoing method 700. Because step 703 is described in detail in the foregoing method 700, for brevity, details are not described herein again.

804: The UDM sends session management subscription information of the terminal device to the SMF.

It should be understood that a specific process of step 804 is similar to that of step 704 in the foregoing method 700. Because step 704 is described in detail in the foregoing method 700, for brevity, details are not described herein again.

805: The SMF determines that an authentication manner is secondary authentication.

It should be understood that a specific process of step 805 is similar to that of step 705 in the foregoing method 700. Because step 705 is described in detail in the foregoing method 700, for brevity, details are not described herein again.

806: The SMF may determine whether to initiate a secondary authentication procedure.

For example, step 807 and step 808 may be included.

807: The SMF requests authentication and authorization information of the terminal device from the UDM.

It should be understood that a specific process of step 807 is similar to that of step 707 in the foregoing method 700. Because step 707 is described in detail in the foregoing method 700, for brevity, details are not described herein again.

808: The UDM sends the authentication and authorization information of the terminal device to the SMF.

It should be understood that a specific process of step 808 is similar to that of step 708 in the foregoing method 700. Because step 708 is described in detail in the foregoing method 700, for brevity, details are not described herein again.

It should be understood that a specific process of step 806 is similar to that of step 706 in the foregoing method 700. Because step 706 is described in detail in the foregoing method 700, for brevity, details are not described herein again.

It is assumed that the SMF determines, through determining, to initiate the secondary authentication procedure.

809: The SMF determines to initiate the secondary authentication procedure.

In the method 800, after determining, depending on whether the authentication result exists, to initiate the secondary authentication procedure, the SMF may further determine whether the secondary authentication procedure is being performed.

For example, in step 806, the SMF may further determine whether the DN that corresponds to the DNN (namely, the DNN in step 801) and that is locally included is performing the secondary authentication procedure. If the DN is performing the secondary authentication procedure, the SMF skips the secondary authentication procedure, and locally stores indication information #4. The indication information #4 indicates that whether to continue to perform the PDU session procedure needs to be determined based on a result of the secondary authentication that is being performed. If the DN is not performing the secondary authentication procedure, the SMF determines to initiate the secondary authentication procedure. Specifically, the following provides descriptions with reference to an embodiment shown in the method 1000.

810: The SMF sends an authentication and authorization request message to the DN-AAA.

The SMF sends the authentication and authorization request message to the DN-AAA, where the request message includes information (such as EAP information) used for authentication and authorization.

811: The DN-AAA determines to authenticate a same terminal device.

The DN-AAA determines, based on the request message sent by the SMF, to perform secondary authentication on a same DN (DN-specific ID) of the same terminal device. The DN-AAA may locally store an SMF identifier and indication information #5, where the indication information #5 indicates that the SMF needs to be notified of a secondary authentication and authorization result.

812: The DN-AAA sends an authentication and authorization response message to the SMF.

The response message sent by the DN-AAA to the SMF may include a suspend indication, indicating the SMF to suspend the PDU session. Suspending or stopping indicates that temporarily stopping establishing the PDU session or temporarily stopping the secondary authentication procedure.

813: The SMF suspends a PDU session.

The SMF suspends the PDU session. In other words, the SMF does not continue to perform the PDU session establishment procedure.

The SMF may determine subsequent processing based on feedback from the DN-AAA, for example, an authentication result for another PDU session. For example, after secondary authentication for the another PDU session succeeds, the SMF may continue the PDU session establishment procedure, and may not need to repeatedly perform the secondary authentication procedure, for example, may perform step 706B in the method 700. For another example, after the secondary authentication for the another PDU session fails, the SMF may terminate establishment of the PDU session. Alternatively, after the authentication and authorization fail, the SMF may determine, based on a failure reason of the authentication, whether to terminate establishment of the PDU session.

For example, the SMF may determine subsequent processing depending on whether the feedback from the DN-AAA is received after preset duration, for example, the secondary authentication result for the another PDU session (namely, the secondary authentication result for the PDU session for which secondary authentication has just been performed). The preset duration may be pre-specified duration, for example, is predefined in a protocol; or may be duration determined based on a historical communication status.

For example, the preset duration may be implemented by using a timer. For example, after suspending the PDU session, the SMF activates the timer by using the preset duration as a time length. For another example, after receiving the authentication and authorization response message from the DN-AAA, the SMF activates the timer by using the preset duration as a time length. If no message of the secondary authentication result for the another PDU session (namely, the secondary authentication result for the PDU session for which secondary authentication has just been performed) is received before the timer expires, it is determined that the secondary authentication for the another PDU session fails, and establishment of the PDU session is terminated.

814: The DN-AAA completes authentication, and determines to notify the SMF.

The DN-AAA may determine, based on locally stored indication information #5, to notify the SMF, or the DN-AAA may notify the SMF by default.

If the secondary authentication and authorization succeed, after the secondary authentication and authorization succeed, the DN-AAA sends, to the SMF, an authentication result indicating that the secondary authentication for the another PDU session succeeds (in other words, the secondary authentication for the another PDU session for which the secondary authentication has just been performed succeeds or fails) and the authentication and authorization information; or if the secondary authentication and authorization fail, after the secondary authentication and authorization fail, the DN-AAA indicates, to the SMF, that the secondary authentication for the another PDU session fails (in other words, the secondary authentication for the another PDU session for which the secondary authentication has just been performed fails). Alternatively, if the secondary authentication and authorization fail, the DN-AAA does not send the secondary authentication result for the another PDU session. After the SMF does not receive the authentication result after the preset duration, the authentication and authorization fail by default.

815: The DN-AAA sends an authentication and authorization result to the SMF.

The authentication and authorization result includes: the authentication result indicating that the secondary authentication for the another PDU session succeeds (in other words, the secondary authentication for the PDU session for which the secondary authentication has just been performed succeeds) and the authentication and authorization information. Alternatively, the authentication and authorization result includes an authentication result indicating that the secondary authentication for the another PDU session fails.

816: The SMF processes the suspended PDU session based on the authentication and authorization result.

For example, the SMF determines, based on the authentication and authorization result, to continue to establish the PDU session or to reject establishment of the PDU session.

In a possible case, the authentication and authorization result includes: the authentication result indicating that the secondary authentication for the another PDU session succeeds (in other words, the secondary authentication for the PDU session for which the secondary authentication has just been performed succeeds) and the authentication and authorization information. In this case, the SMF determines, based on the authentication result, to continue to establish the PDU session, does not need to perform the secondary authentication procedure again, and continues to establish the PDU session based on the authentication and authorization information.

In another possible case, the authentication and authorization result includes the authentication result indicating that the secondary authentication for the another PDU session fails. In this case, the SMF may determine, based on the authentication and authorization result, to reject establishment of the PDU session, in other words, to terminate establishment of the PDU session. Alternatively, in this case, the SMF may determine, based on a failure reason of the authentication and authorization, whether to reject establishment of the PDU session.

Optionally, when the authentication and authorization succeed, the SMF may report address information of the PDU session to the DN-AAA.

817: The SMF reports address information of the PDU session to the DN-AAA.

For example, the address information of the PDU session may include but is not limited to, an IP address, a MAC address, or VIDs.

In an example, the SMF may report the address information of the PDU session based on an indication of the DN-AAA. For example, the SMF may determine, based on the PDU session information reporting indication in the authentication and authorization information, to notify the DN-AAA of the address information of the PDU session.

In another example, the SMF may determine, based on a local configuration (for example, a requirement that the address information of the PDU session needs to be notified is locally configured), to notify the DN-AAA of the address information of the PDU session.

In another example, the SMF may determine, based on the subscription information obtained from the UDM, to notify the DN-AAA of the address information of the PDU session.

Optionally, the SMF may further include a GPSI of the terminal device.

The foregoing describes some embodiments with reference to the method 800 shown in FIG. 8A and FIG. 8B. According to these embodiments of this disclosure, during PDU session establishment, the authentication server of the DN determines whether the secondary authentication procedure is being performed, and stores the indication information, so that the secondary authentication procedure is skipped and the authentication and authorization result is directly sent to the SMF. Therefore, the authentication server of the DN may determine to reuse the secondary authentication result, so that signaling overheads caused by repeatedly performing the secondary authentication procedure are avoided.

Figure 9A:
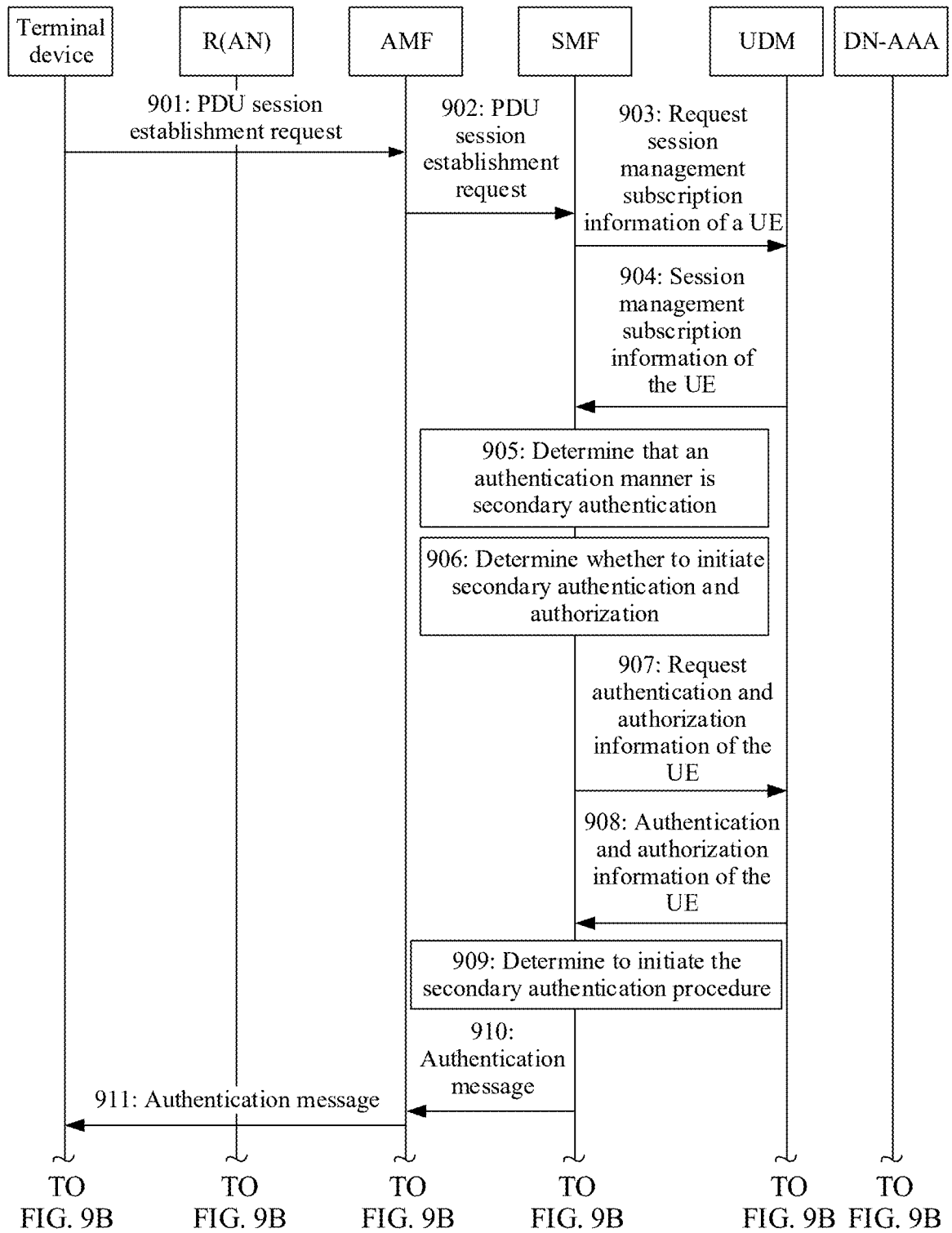
FIG. 9A and FIG. 9B are a schematic diagram of an authentication and authorization method applicable to still another embodiment of this disclosure.
Figure 9B:
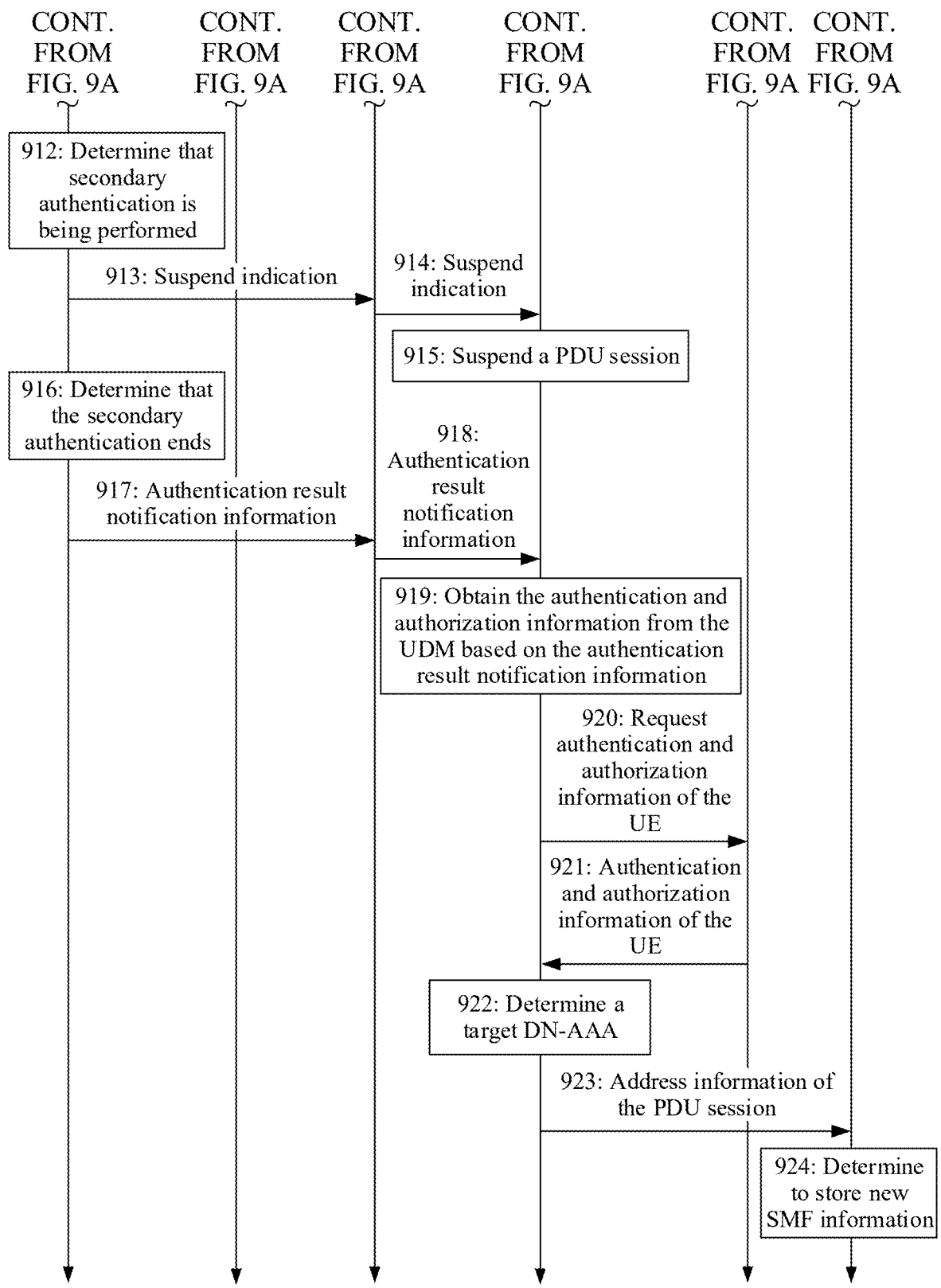

FIG. 9A and FIG. 9B are a schematic interaction diagram of a method 900 applicable to another embodiment of this disclosure. The method 900 mainly describes the foregoing solution in which the secondary authentication is being performed. In the method 900, after the SMF determines, depending on whether the authentication result exists, to initiate a secondary authentication procedure, the terminal device may indicate the SMF to suspend a session.

The method 900 may include the following steps.

901: A terminal device initiates a PDU session establishment request to an AMF.

It should be understood that a specific process of step 901 is similar to that of step 701 in the foregoing method 700. Because step 701 is described in detail in the foregoing method 700, for brevity, details are not described herein again.

902: The AMF sends the PDU session establishment request to an SMF.

It should be understood that a specific process of step 902 is similar to that of step 702 in the foregoing method 700. Because step 702 is described in detail in the foregoing method 700, for brevity, details are not described herein again.

903: The SMF requests session management subscription information of the terminal device from a UDM.

It should be understood that a specific process of step 903 is similar to that of step 703 in the foregoing method 700. Because step 703 is described in detail in the foregoing method 700, for brevity, details are not described herein again.

904: The UDM sends session management subscription information of the terminal device to the SMF.

It should be understood that a specific process of step 804 is similar to that of step 704 in the foregoing method 700. Because step 704 is described in detail in the foregoing method 700, for brevity, details are not described herein again.

905: The SMF determines that the PDU session requires secondary authentication and authorization.

It should be understood that a specific process of step 905 is similar to that of step 705 in the foregoing method 700. Because step 705 is described in detail in the foregoing method 700, for brevity, details are not described herein again.

906: The SMF may determine whether to initiate a secondary authentication procedure.

For example, step 907 and step 908 may be included.

907: The SMF requests authentication and authorization information of the terminal device from the UDM.

It should be understood that a specific process of step 907 is similar to that of step 707 in the foregoing method 700. Because step 707 is described in detail in the foregoing method 700, for brevity, details are not described herein again.

908: The UDM sends the authentication and authorization information of the terminal device to the SMF.

It should be understood that a specific process of step 908 is similar to that of step 708 in the foregoing method 700. Because step 708 is described in detail in the foregoing method 700, for brevity, details are not described herein again.

It should be understood that a specific process of step 906 is similar to that of step 906 in the foregoing method 700. Because step 906 is described in detail in the foregoing method 700, for brevity, details are not described herein again.

It is assumed that the SMF determines, through determining, to initiate the secondary authentication procedure.

909: The SMF determines to initiate the secondary authentication procedure.

910: The SMF sends an authentication message (authentication message) to the AMF.

The SMF sends the authentication message to the terminal device, so that the terminal device performs authentication. Optionally, the SMF may send the authentication message to the terminal device by using the AMF.

For example, the SMF may send an $N_{amf}$ interface N1N2 message transfer ($N_{smf}$ N1N2MessageTransfer) message to the AMF, where the message includes the authentication message.

911: The AMF sends the authentication message to the terminal device.

For example, the AMF may send a NAS session management (session management, SM) transport (NAS SM transport) message to the terminal device, where the message includes the authentication message.

After receiving the authentication message, the terminal device may determine whether the secondary authentication is being performed. It is assumed that the terminal device determines that secondary authentication is being performed.

912: The terminal device determines that secondary authentication is being performed.

If determining that secondary authentication is being performed on a same DN (or corresponding to a same DN-specific Id), the terminal device may send a suspend indication (namely, indication information #2) to the SMF. The terminal device may send the suspend indication to the SMF by using the AMF.

Optionally, the terminal device may further locally store the indication information #5, indicating that the SMF needs to be notified of a secondary authentication and authorization result (for example, the terminal device sends the indication information #1). Alternatively, it may be pre-specified that the terminal device needs to notify the SMF of a secondary authentication and authorization result.

913: The terminal device sends a suspend indication to the AMF.

For example, the terminal device may send the NAS SM transport message to the AMF, where the message includes the suspend indication. The suspend indication indicates that the SMF is performing the secondary authentication procedure.

914: The AMF sends the suspend indication to the SMF.

For example, the AMF may send an $N_{smf}$ interface PDU session update session management context ($N_{smf}$_PDUSession_UpdateSMContext) message to the SMF, where the message includes the suspend indication. The suspend indication indicates that the SMF is performing the secondary authentication procedure.

915: The SMF suspends a PDU session.

After receiving the suspend indication, the SMF suspends the PDU session, in other words, does not continue to perform the PDU session establishment procedure. Optionally, after receiving the suspend indication, the SMF may further subscribe to an authorization result notification to the UDM. Based on the subscription to the authorization result notification, the UDM notifies the SMF when receiving a new authentication result. Alternatively, optionally, after receiving the suspend indication, the SMF may further subscribe to an authorization result notification to the DN-AAA. Based on the subscription to the authorization result notification, the DN-AAA notifies the SMF when receiving a new authentication result.

The SMF may determine subsequent processing based on feedback of the terminal device, for example, an authentication result indicating that secondary authentication for another PDU session succeeds or an authentication result indicating that secondary authentication for another PDU session fails. For example, after secondary authentication for the another PDU session succeeds, the SMF may continue the PDU session establishment procedure, and may not need to repeatedly perform the secondary authentication procedure, for example, may perform step 706B in the method 700. For another example, after the secondary authentication for the another PDU session fails, the SMF may terminate establishment of the PDU session; or determine, based on a failure reason of the authentication and authorization, whether to terminate the establishment of the PDU session.

For example, the SMF may determine subsequent processing depending on whether the feedback of the terminal device is received after preset duration, for example, the authentication result of the secondary authentication for the another PDU session. The preset duration may be pre-specified duration, for example, is predefined in a protocol; or may be duration determined based on a historical communication status.

For example, the preset duration may be implemented by using a timer. For example, after suspending the PDU session, the SMF activates the timer by using the preset duration as a time length. For another example, after receiving the suspend indication from the AMF, the SMF activates the timer by using the preset duration as a time length. If no authentication result of the secondary authentication for the another PDU session is received before the timer expires, the SMF determines that the authentication and authorization fail, and terminates the establishment of the PDU session.

916: The terminal device determines that the secondary authentication ends.

After determining that the secondary authentication ends, the terminal device may send authentication result notification information to the SMF based on the locally stored indication information #5 or the pre-specification. For example, the terminal device may notify the SMF of the secondary authentication result, or the terminal device may notify the SMF to obtain the secondary authentication result.

The terminal device may send the authentication result notification information to the SMF by using the AMF.

917: The terminal device sends authentication result notification information to the AMF.

For example, the terminal device may send a NAS SM transport message to the AMF, where the message includes the authentication result notification information.

918: The AMF sends the authentication result notification information to the SMF.

For example, the AMF may send an $N_{smf}$_PDUSession_UpdateSMContext message to the SMF, where the message includes the authentication result notification information, and the authentication result notification information indicates that the secondary authentication for the session succeeds or fails.

In a case, if the authentication result notification information notifies the SMF of the secondary authentication result, the SMF may determine, based on the authentication result notification information, that the authentication and authorization succeed or fail.

In another case, if the authentication result notification information notifies the SMF to obtain the secondary authentication result, the SMF may request, based on the authentication result notification information, the UDM to provide the secondary authentication and authorization result. In this case, the method 900 may further include steps 919 to 921.

919: The SMF obtains the authentication and authorization information from the UDM based on the authentication result notification information.

920: The SMF requests authentication and authorization information of the terminal device from the UDM.

It should be understood that a specific process of step 920 is similar to that of step 707 in the foregoing method 700. Because step 707 is described in detail in the foregoing method 700, for brevity, details are not described herein again.

It should be further understood that step 920 may alternatively not be performed. To be specific, based on the previous authorization result notification subscribed by the SMF, the UDM notifies the SMF when receiving the new authentication result.

921: The UDM sends the authentication and authorization information of the terminal device to the SMF.

It should be understood that a specific process of step 921 is similar to that of step 708 in the foregoing method 700. Because step 708 is described in detail in the foregoing method 700, for brevity, details are not described herein again.

The SMF may determine the authentication and authorization result based on the notification of the terminal device or the authentication and authorization information of the terminal device obtained from the UDM, and may determine, based on the authentication and authorization result, to continue to establish the PDU session or reject establishment of the PDU session.

In a possible case, the authentication and authorization result includes: the authentication result indicating that the secondary authentication for the another PDU session succeeds (in other words, the secondary authentication for the PDU session for which the secondary authentication has just been performed succeeds) and the authentication and authorization information. In this case, the SMF determines, based on the authentication and authorization result, to continue to establish the PDU session, does not need to perform the secondary authentication procedure again, and continues to establish the PDU session based on the authentication and authorization information.

In another possible case, the authentication and authorization result includes the authentication result indicating that the secondary authentication for the another PDU session fails. In this case, the SMF determines, based on the authentication and authorization result, to reject establishment of the PDU session, in other words, to terminate establishment of the PDU session. Alternatively, in this case, the SMF may determine, based on a failure reason of the authentication and authorization, whether to reject establishment of the PDU session.

Optionally, when the authentication and authorization succeed, the SMF may report address information of the PDU session to the DN-AAA. For example, the address information of the PDU session may include but is not limited to, an IP address, a MAC address, or VIDs.

When the authentication and authorization succeed, if the SMF determines that the address information of the PDU session needs to be reported to the DN-AAA, the SMF may determine a target DN authentication server based on the DN-specific Id.

922: The SMF determines a target DN-AAA.

The SMF may determine the target DN-AAA based on the obtained DN-specific Id (DNN).

923: The SMF reports address information of the PDU session to the target DN-AAA.

Optionally, the SMF may determine an address of the target DN-AAA based on the DN-specific Id, or the SMF may report a PDU session address to the DN-AAA based on a DN-AAA address in the authentication and authorization information.

924: The DN-AAA determines to store new SMF information.

If the SMF is a new SMF, the DN-AAA determines to store the SMF information.

In a possible implementation, the DN-AAA may determine, depending on whether the DN-AAA has locally established an association with the SMF, whether to store the SMF information.

For example, if the DN-AAA has established the association with the SMF, it indicates that the SMF is not new, and therefore the SMF information does not need to be stored.

For another example, if the DN-AAA has not established the association with the SMF, it indicates that the SMF is new, and therefore the SMF information is stored.

The foregoing describes some embodiments with reference to the method 900 shown in FIG. 9A and FIG. 9B. According to these embodiments of this disclosure, during PDU session establishment, the terminal device determines whether the secondary authentication procedure is being performed, and stores the indication information, so that the secondary authentication procedure is skipped and the authentication and authorization result is directly sent to the SMF. Therefore, the terminal device may indicate that the secondary authentication is being performed, so that signaling overheads caused by repeatedly performing the secondary authentication procedure are avoided.

FIG. 10 is a schematic interaction diagram of a method 1000 applicable to yet another embodiment of this disclosure. That when requesting to establish a session, the terminal device indicates the SMF to suspend the session or whether to initiate a secondary authentication procedure is mainly described in the method 1000.

The method 1000 may include the following steps.

1001: The terminal device determines PDU sessions corresponding to a same DN.

It may be understood that before sending a PDU session establishment request, the terminal device may first determine the PDU sessions that are established and that correspond to the same DN. To be specific, a DN of a previously established session is the same as a DN that is performing secondary authentication.

For example, the terminal device determines that the established PDU session is one of redundant PDU sessions corresponding to the DN.

For another example, the terminal device determines that a PDU session that corresponds to the same DN and that uses a DNN different from a previous DNN is used.

For another example, the terminal device determines that a secondary authentication procedure is being performed for one PDU session corresponding to the same DN.

1002: A terminal device initiates a PDU session establishment request to an AMF.

It should be understood that a specific process of step 1002 is similar to that of step 701 in the foregoing method 700. Because step 701 is described in detail in the foregoing method 700, for brevity, details are not described herein again.

Different from step 701, in step 1002, the terminal device may further send information (namely, indication information #1) used to determine whether to perform the secondary authentication procedure. For example, the PDU session establishment request includes the information used to determine whether to perform the secondary authentication procedure. Alternatively, the terminal device may alternatively separately send the information used to determine whether to perform the secondary authentication procedure to the AMF.

Optionally, the terminal device may send one or more of the following: DNN information, a PDU session ID of an associated PDU session, an indication indicating that secondary authentication is being performed, or an indication (namely, indication information #2) indicating that secondary authentication does not need to be performed.

In an example, when the terminal device determines that the established PDU session is one of the redundant PDU sessions corresponding to the DN, the terminal device may send information about the associated PDU session, for example, the PDU session ID of the associated PDU session.

In another example, when the terminal device determines that the PDU session that is in the same DN and that is different from the previous DNN is used, the terminal device may send the DNN information, namely, the DNN of the PDU session previously established with the DN.

In another example, when the terminal device determines that a secondary authentication procedure is being performed for a PDU session corresponding to the same DN, the terminal device may send the indication indicating that secondary authentication is being performed or the indication (namely, indication information #2) indicating that secondary authentication does not need to be performed.

1003: The AMF sends the PDU session establishment request to an SMF.

It should be understood that a specific process of step 1003 is similar to that of step 702 in the foregoing method 700. Because step 702 is described in detail in the foregoing method 700, for brevity, details are not described herein again.

Different from step 702, in step 1003, the AMF may further send, to the SMF, the information used to determine whether to perform the secondary authentication procedure. For example, the PDU session establishment request includes the information used to determine whether to perform the secondary authentication procedure. Alternatively, the terminal device may alternatively separately send the information used to determine whether to perform the secondary authentication procedure to the SMF.

1004: The SMF requests session management subscription information of the terminal device from a UDM.

For example, the SMF may send an $N_{udm}$_SDM_Get message to the UDM, to request the session management subscription information of the terminal device.

In a case, if the information (namely, the indication information #1) used to determine whether to perform the secondary authentication procedure includes the indication information (namely, the indication information #2) indicating that secondary authentication is being performed, the $N_{udm}$_SDM_Get message sent by the SMF to the UDM may include indication information indicating the UDM to notify the SMF after the UDM receives the authentication and authorization information of the terminal device. In this case, the method 1000 may include performing steps 1006 and 1007.

In still another case, if the information (namely, the indication information #1) used to determine whether to perform the secondary authentication procedure includes the DNN information, the $N_{udm}$_SDM_Get message sent by the SMF to the UDM may include authentication and authorization information indicating the UDM to send a corresponding DNN. In this case, steps 1006 and 1007 do not need to be performed.

In still another case, if the information (namely, the indication information #1) used to determine whether to perform the secondary authentication procedure includes the PDU session ID of the associated PDU session, the $N_{udm}$_SDM_Get message sent by the SMF to the UDM may include corresponding authentication and authorization information indicating the UDM to send the PDU session ID. In this case, steps 1009 and 1010 do not need to be performed.

1005: The UDM sends session management subscription information of the terminal device to the SMF.

For example, the UDM may send an $N_{udm}$_SDM_Get response message to the SMF, where the response message includes the session management subscription information of the terminal device.

After obtaining the session management subscription information of the terminal device, the SMF may determine whether secondary authentication and authorization need to be performed for the PDU session. It is assumed that the SMF determines that the PDU session requires the secondary authentication and authorization.

1006: The SMF determines that an authentication manner is secondary authentication. In other words, the SMF determines that the PDU session requires the secondary authentication and authorization.

It should be understood that a specific process of step 1006 is similar to that of step 705 in the foregoing method 700. Because step 705 is described in detail in the foregoing method 700, for brevity, details are not described herein again.

1007: The SMF may determine whether to initiate a secondary authentication procedure.

Case 1: The terminal device determines that the secondary authentication procedure is being performed for a PDU session corresponding to the same DN, and sends, to the SMF, indication information (namely, the indication information #2) indicating that secondary authentication is being performed, and the SMF may determine, based on the indication, to skip the secondary authentication.

Case 2: The terminal device determines that the established PDU session is one of the redundant PDU sessions corresponding to the DN, and sends the associated PDU session information (for example, the PDU session ID of the associated PDU session) to the SMF, and the SMF may determine, based on the indication, to skip secondary authentication.

In case 1 or case 2, the SMF may send a subscribe (subscribe) message (for example, an $N_{udm}$ SDM_subscribe message) to the UDM, where the message indicates the UDM to notify the SMF after receiving the authentication and authorization information of the terminal device. In other words, the SMF may subscribe to an authorization result notification to the UDM, and the UDM notifies the SMF when receiving a new authentication result. Alternatively, the SMF may subscribe to an authorization result notification to the DN-AAA. Optionally, in this case, the SMF may directly send a request message to the DN-AAA or the UDM, to request to notify an authentication and authorization result (namely, an authentication result of secondary authentication for another PDU session). If the authentication and authorization succeed, the SMF determines, based on the authentication and authorization result, to continue to establish the PDU session; or if the authentication and authorization fail, the SMF determines, based on the authentication and authorization result, to reject establishment of the PDU session, in other words, to terminate establishment of the PDU session, or determines, based on a failure reason of the authentication and authorization, whether to reject establishment of the PDU session.

It should be understood that the foregoing is merely an example for description. For example, in case 1 or case 2, the SMF may further check whether secondary authentication is being performed locally or an authentication result exists. If not, the SMF subscribes to the result to the UDM or a DN-AAA.

Case 3: The terminal device determines that the PDU session that is in the same DN and that is different from the previous DNN is used, and sends, to the SMF, the DNN information, namely, the DNN of the PDU session previously established with the DN, and the SMF may determine, based on the DNN information, to skip secondary authentication.

In case 3, the SMF may determine, based on local information, whether an authentication and authorization result corresponding to the DNN exists. If the authentication and authorization result corresponding to the DNN exists locally, the authentication and authorization result is reused. If no authentication and authorization result corresponding to the DNN exists locally, the UDM is queried for whether the authentication and authorization result corresponding to the DNN exists. Optionally, when querying the UDM for whether the authentication and authorization result corresponding to the DNN exists, the SMF may include the DNN information in a query request. In still another case, if the information (namely, the indication information #1) used to determine whether to perform the secondary authentication procedure includes the PDU session ID of the associated PDU session, the SMF may determine, based on the local information, whether there is an authentication and authorization result corresponding to the PDU session ID. If the authentication and authorization result corresponding to the PDU session ID exists locally, the authentication and authorization result is reused. If no authentication and authorization result corresponding to the PDU session ID exists locally, the UDM is queried for whether the authentication and authorization result corresponding to the PDU session ID exists. Optionally, when querying the UDM for whether the authentication and authorization result corresponding to the PDU session ID exists, the SMF may include the PDU session ID in the query request.

The foregoing three cases are merely examples for description. Through step 1007, the SMF may determine, based on the indication of the terminal device, whether to initiate the secondary authentication procedure. Alternatively, the SMF may determine, through querying locally or based on the UDM, whether to initiate the secondary authentication procedure.

1008: The SMF determines to skip a secondary authentication procedure.

Case 1 or case 2 is used as an example. In this case, the SMF may send a subscribe message to the UDM. In other words, the method 1000 may include step 1009.

1009: The SMF sends a subscribe message to the UDM.

To be specific, the SMF subscribes to an event from the UDM, to indicate the UDM to notify the SMF after receiving the authentication and authorization information of the terminal device.

It should be understood that for ease of description, FIG. 10 merely shows a case in which the SMF sends the subscribe message to the UDM. This is not limited. For example, the SMF may alternatively send the subscribe message to the DN-AAA.

1010: The UDM sends authentication and authorization information to the SMF.

When receiving the authentication and authorization information, the UDM notifies the SMF. The SMF may continue to establish the PDU session based on the authentication and authorization information.

1011: The SMF reports address information of the PDU session to the DN-AAA.

Optionally, the SMF may report a PDU session address to the DN-AAA.

Optionally, the SMF may further include a GPSI of the terminal device.

1012: The DN-AAA determines to store new SMF information.

The DN-AAA may store the SMF information.

It should be understood that a specific process of step 1012 is similar to that of step 924 in the foregoing method 900. Because step 924 is described in detail in the foregoing method 900, for brevity, details are not described herein again.

The foregoing describes some embodiments with reference to the method 1000 shown in FIG. 10. According to these embodiments of this disclosure, the terminal device sends the indication information to the SMF, so that the SMF perceives whether secondary authentication is being performed or PDU sessions that use different DNNs have been established. Therefore, the SMF may identify the PDU sessions that use different DNNs in the same DN and whether the secondary authentication procedure is being performed, so that signaling overheads caused by repeatedly performing the secondary authentication procedure are avoided.

The foregoing describes several possible complete procedures in detail with reference to FIG. 7(1) and FIG. 7(2) to FIG. 10. It should be understood that in the foregoing embodiments, the network elements may perform some or all of the steps in the embodiments. These steps or operations are merely examples. Other operations or variations of various operations may further be performed in embodiments of this disclosure. In addition, the steps may be performed in a sequence different from a sequence presented in embodiments, and not all operations in embodiments of this disclosure may be necessarily to be performed. In addition, sequence numbers of the steps do not mean an execution sequence. An execution sequence of the processes should be determined based on functions and internal logic of the processes, and should not constitute any limitation on the implementation processes of embodiments of this disclosure.

It should be understood that in some of the foregoing embodiments, an example in which the session is the PDU session is used for description. This is not limited. Any session used to access the DN is applicable to embodiments of this disclosure.

It should be further understood that in some of the foregoing embodiments, messages such as an Nsmf_PDUSession_UpdateSMContext Request message, an Nudm_SDM_Get message, an Nudm_SDM_Get response message, an Nudm_UE_Get message, an Nudm_UE_Get response message, an Nudm_SDM_Update message, and an Nudm_SDM_Updateresponse message are used, and names and types of the messages are not limited. Any message that can implement a same function is applicable to embodiments of this disclosure.

Based on the foregoing technical solution, an authentication and authorization procedure may be used by the data network to authenticate and authorize whether the terminal device can establish the session to access the data network. Specifically, during session establishment, the SMF may determine, depending on whether the data network has successfully authenticated and authorized the terminal device, whether to initiate the secondary authentication procedure, so that it can be ensured that in a scenario in which different DNNs are used to identify the data network, the secondary authentication procedure can also be prevented from being repeatedly performed. According to embodiments of this disclosure, it can be ensured that even if different DNNs are used to access the data network, the SMF can also prevent the secondary authentication procedure as much as possible from being repeatedly performed.

In addition, based on the foregoing technical solution, during session establishment, the authentication server of the DN or the terminal device determines whether the secondary authentication procedure is being performed, and stores the indication information, so that the secondary authentication procedure is skipped and the authentication and authorization result is directly sent to the SMF. Therefore, the authentication server of the DN or the terminal device may determine to reuse the secondary authentication result, so that signaling overheads caused by repeatedly performing the secondary authentication procedure are avoided.

Embodiments described in this specification may be independent solutions, or may be combined based on internal logic. All these solutions fall within the protection scope of this disclosure.

It may be understood that in the foregoing method embodiments, the methods and the operations implemented by the devices (such as the SMF, the terminal device, or the authentication server of the DN) may alternatively be implemented by using components (such as chips or circuits) that may be used in the devices.

The methods provided in embodiments of this disclosure are described above in detail with reference to FIG. 6 to FIG. 10. Apparatuses provided in embodiments of this disclosure are described below in detail with reference to FIG. 11 and FIG. 12. It should be understood that descriptions of the apparatus embodiments correspond to descriptions of the method embodiments. Therefore, for content not described in detail, refer to the foregoing method embodiments. For brevity, details are not described herein again.

The foregoing mainly describes the solutions provided in embodiments of this disclosure from a perspective of interaction between network elements. It may be understood that, to implement the foregoing functions, the network elements, for example, the terminal device, the SMF, or the DN-AAA, include corresponding hardware structures and/or software modules for performing the functions. A person skilled in the art may be aware that, with reference to units and algorithm steps of the examples described in embodiments disclosed in this specification, this disclosure may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this disclosure.

In embodiments of this disclosure, the network elements may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, division into the modules is an example, and is merely a logical function division. During actual implementation, another division manner may be used. An example in which each functional module is obtained through division based on each corresponding function is used below for description.

Figure 11:
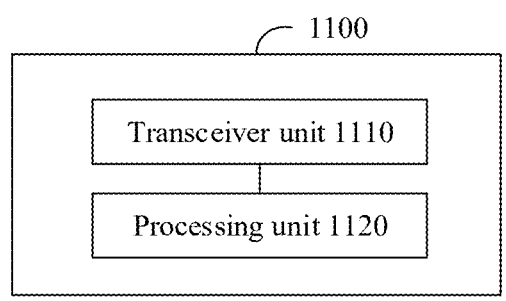
FIG. 11 is a schematic block diagram of an authentication and authorization apparatus according to an embodiment of this disclosure.

FIG. 11 is a schematic block diagram of an authentication and authorization apparatus according to an embodiment of this disclosure. The apparatus 1100 includes a transceiver unit 1110 and a processing unit 1120. The transceiver unit 1110 may implement a corresponding communication function, and the processing unit 1120 is configured to process data. The transceiver unit 1110 may also be referred to as a communication interface or a communication unit.

Optionally, the apparatus 1100 may further include a storage unit. The storage unit may be configured to store instructions and/or data. The processing unit 1120 may read the instructions and/or the data in the storage unit, so that the communication apparatus implements the foregoing method embodiments.

The apparatus 1100 may be configured to perform an action performed by the terminal device in the foregoing method embodiments. In this case, the apparatus 1100 may be the terminal device or a component that may be configured in the terminal device. The transceiver unit 1110 is configured to perform receiving or sending related operations on a terminal device side in the foregoing method embodiments. The processing unit 1120 is configured to perform processing-related operations on the terminal device side in the foregoing method embodiments.

Alternatively, the apparatus 1100 may be configured to perform an action performed by the SMF in the foregoing method embodiments. In this case, the apparatus 1100 may be the SMF or a component that may be configured in the SMF. The transceiver unit 1110 is configured to perform receiving or sending related operations on an SMF side in the foregoing method embodiments. The processing unit 1120 is configured to perform processing-related operations on the SMF side in the foregoing method embodiments.

Alternatively, the apparatus 1100 may be configured to perform an action performed by the authentication server of the DN (or the authentication network element of the DN) in the foregoing method embodiments. In this case, the apparatus 1100 may be the authentication server of the DN or a component that may be configured in the authentication server of the DN. The transceiver unit 1110 is configured to perform receiving and sending related operations on an authentication server side of the DN in the foregoing method embodiments. The processing unit 1120 is configured to perform processing-related operations on the authentication server side of the DN in the foregoing method embodiments.

In a design, the apparatus 1100 is configured to perform an action performed by the SMF in the embodiment shown in FIG. 6.

In an implementation, the transceiver unit 1110 is configured to: receive a session establishment request message from a terminal device, where the session establishment request message is used to request to establish a session with a data network. The processing unit 1120 is configured to: determine whether an authentication result of authentication and/or authorization by the data network on the terminal device exists; and when the authentication result exists, skip a secondary authentication procedure for the session.

In an example, the authentication result includes authentication and authorization information, where the authentication and authorization information includes one or more of the following: one or more data network identifiers, an identifier of an authentication network element of the data network, validity information, an index of a text authorized by the data network, a session-aggregate maximum bit rate authorized by the data network, an allowed media access control address, an allowed virtual local area network identifier, and information indicating to report session information.

In another example, the processing unit 1120 is configured to: initiate the secondary authentication procedure for the session, or suspend the session when it is determined that no authentication result exists.

In another example, the processing unit 1120 is specifically configured to: suspend the session based on first indication information sent by the terminal device or an authentication network element of the data network, where the first indication information indicates the data network to perform secondary authentication for another session of the terminal device.

In another example, the processing unit 1120 is further configured to: when no authentication result exists, determine whether the data network is to perform secondary authentication for another session of the terminal device; and when the data network is determined to perform secondary authentication for the another session of the terminal device, suspend the session; or when the data network does not perform secondary authentication for the another session of the terminal device, initiate the secondary authentication procedure for the session.

In another example, the transceiver unit 1110 is further configured to: obtain an authentication result of authentication and/or authorization by the data network for the another session of the terminal device, where the authentication result for the another session indicates that secondary authentication for the another session succeeds or fails.

In another example, the processing unit 1120 is further configured to: when the authentication result for the another session indicates that the secondary authentication for the another session succeeds, skip the secondary authentication procedure for the session, and continue a subsequent session establishment procedure; or when the authentication result for the another session indicates that the secondary authentication for the another session fails, reject establishment of the session.

In another example, the processing unit 1120 is further configured to: after secondary authentication for the session succeeds, determine, based on any one of the following: a session attribute of the session, a local policy, or second indication information, whether to store an authentication result for the session, where the second indication information is information that is from an authentication network element of the data network or from the terminal device and that indicates whether to store the authentication result for the session.

In another example, the processing unit 1120 is specifically configured to: determine whether the authentication result locally exists; determine whether the authentication result exists in a unified data management network element; determine, based on third indication information from the terminal device or from the authentication network element of the data network, whether the authentication result exists; or determine whether the authentication result exists in an authenticated dataset.

In another example, the processing unit 1120 is specifically configured to: when the authenticated dataset includes an identifier of the data network, determine that the authentication result exists; or when the authenticated dataset does not include an identifier of the data network, determine that no authentication result exists.

In another implementation, the transceiver unit 1110 is configured to: receive a session establishment request message from a terminal device, where the session establishment request message is used to request to establish a session with a data network. The processing unit 1120 is configured to: determine whether the data network is to perform secondary authentication for another session of the terminal device; and when the data network is determined to perform secondary authentication for the another session of the terminal device, suspend the session.

In an example, the processing unit 1120 is specifically configured to: suspend the session based on first indication information carried in the session establishment request message, where the first indication information indicates the data network to perform secondary authentication for the another session of the terminal device.

In another example, the transceiver unit 1110 is further configured to: obtain an authentication result of authentication and/or authorization by the data network for the another session of the terminal device, where the authentication result for the another session indicates that secondary authentication for the another session succeeds or fails.

In another example, the processing unit 1120 is further configured to: when the authentication result for the another session indicates that the secondary authentication for the another session succeeds, skip the secondary authentication procedure for the session, and continue a subsequent session establishment procedure; or when the authentication result for the another session indicates that the secondary authentication for the another session fails, reject establishment of the session.

In another example, the processing unit 1120 is further configured to: when the data network does not perform secondary authentication for the another session of the terminal device, determine whether an authentication result of authentication and/or authorization by the data network on the terminal device exists; and when the authentication result exists, skip a secondary authentication procedure for the session; or when no authentication result exists, initiate a secondary authentication procedure for the session.

In another example, the processing unit 1120 is further configured to: determine, based on any one of the following: a session attribute of the session, a local policy, or second indication information, whether to store an authentication result for the session, where the second indication information is information that is from an authentication network element of the data network or from the terminal device and that indicates whether to store the authentication result for the session.

In another example, the processing unit 1120 is specifically configured to: determine whether the authentication result locally exists; determine whether the authentication result exists in a unified data management network element; determine, based on third indication information from the terminal device or from the authentication network element of the data network, whether the authentication result exists; or determine whether the authentication result exists in an authenticated dataset.

In another example, the processing unit 1120 is specifically configured to: when the authenticated dataset includes an identifier of the data network, determine that the authentication result exists; or when the authenticated dataset does not include an identifier of the data network, determine that no authentication result exists.

The apparatus 1100 may implement the steps or the procedures performed by the SMF in the method 600 to the method 1000 according to embodiments of this disclosure. The apparatus 1100 may include units configured to perform the methods performed by the SMF in the method 600 in FIG. 6 to the method 1000 in FIG. 10. In addition, the units in the apparatus 1100 and the foregoing other operations and/or functions are separately intended to implement corresponding procedures of the method 600 in FIG. 6 to the method 1000 in FIG. 10.

When the apparatus 1100 is configured to perform the method 600 in FIG. 6, the transceiver unit 1110 may be configured to perform step 610 in the method 600, and the processing unit is configured to perform 620, 631, or 632 in the method 600.

When the apparatus 1100 is configured to perform the method 700 in FIG. 7(1) and FIG. 7(2), the transceiver unit 1110 may be configured to perform steps 702, 703, 704, 707, 708, 706A3, 706A5, 706A6 and 706B4 in the method 700, and the processing unit 1120 may be configured to perform steps 705, 706, 706A1, 706A2, 706A4, 706A7, 706B1, 706B2, 706B3 and 706B6 in the method 700.

When the apparatus 1100 is configured to perform the method 800 in FIG. 8A and FIG. 8B, the transceiver unit 1110 may be configured to perform steps 803, 804, 807, 808, 810, 812, 815 and 817 in the method 800, and the processing unit 1120 may be configured to perform steps 805, 806, 809, 813, and 816 in the method 800.

When the apparatus 1100 is configured to perform the method 900 in FIG. 9A and FIG. 9B, the transceiver unit 1110 may be configured to perform steps 903, 904, 907, 908, 910, 914, 918, 920, 921 and 923 in the method 900, and the processing unit 1120 may be configured to perform steps 905, 906, 909, 915, 919, and 922 in the method 900.

When the apparatus 1100 is configured to perform the method 1000 in FIG. 10, the transceiver unit 1110 may be configured to perform steps 1004, 1005, 1007, 1009, and 1010 in the method 1000, and the processing unit 1120 may be configured to perform steps 1006, 1007, and 1008 in the method 1000.

It should be understood that a specific process in which the units perform the foregoing corresponding steps is described in detail in the foregoing method embodiments. For brevity, details are not described herein again.

In another design, the apparatus 1100 is configured to perform an action performed by the terminal device in the embodiment shown in FIG. 6.

In an implementation, the transceiver unit 1110 is configured to: receive a session establishment request message from a terminal device, where the session establishment request message is used to request to establish a session with a data network. The processing unit 1120 is configured to: determine, in a process of performing secondary authentication for the session with the data network, whether the data network is to perform secondary authentication for another session of the terminal device. The transceiver unit 1110 is further configured to: when the data network is determined to perform secondary authentication for the another session of the terminal device, send first indication information to the session management network element, where the first indication information indicates the data network to perform secondary authentication for the another session of the terminal device.

In an example, the processing unit 1120 is specifically configured to: after the transceiver unit 1110 receives an authentication protocol request message from the session management network element, determine whether the data network is to perform secondary authentication for the another session of the terminal device.

In another example, the transceiver unit 1110 is further configured to: send an authentication result for the another session to the session management network element, where the authentication result for the another session indicates that the secondary authentication for the another session succeeds or fails.

In another example, the transceiver unit 1110 is further configured to: determine, based on stored information and one or more session attributes of the session, to send the authentication result for the another session to the session management network element after secondary authentication performed by the data network for the another session of the terminal device ends, where the stored information indicates to send the authentication result for the another session to the session management network element after secondary authentication performed by the data network for the another session of the terminal device ends.

In another example, the transceiver unit 1110 is further configured to: send second indication information to the session management network element, where the second indication information indicates whether to store information about the authentication result of authentication and/or authorization by the data network on the terminal device.

The apparatus 1100 may implement the steps or the procedures performed by the SMF in the method 600 to the method 1000 according to embodiments of this disclosure. The apparatus 1100 may include units configured to perform the methods performed by the SMF in the method 600 in FIG. 6 to the method 1000 in FIG. 10. In addition, the units in the apparatus 1100 and the foregoing other operations and/or functions are separately intended to implement corresponding procedures of the method 600 in FIG. 6 to the method 1000 in FIG. 10.

When the apparatus 1100 is configured to perform the method 600 in FIG. 6, the transceiver unit 1110 may be configured to perform step 610 in the method 600.

When the apparatus 1100 is configured to perform the method 700 in FIG. 7(1) and FIG. 7(2), the transceiver unit 1110 may be configured to perform step 701 in the method 700.

When the apparatus 1100 is configured to perform the method 800 in FIG. 8A and FIG. 8B, the transceiver unit 1110 may be configured to perform step 801 in the method 800.

When the apparatus 1100 is configured to perform the method 900 in FIG. 9A and FIG. 9B, the transceiver unit 1110 may be configured to perform steps 901, 911, 913, and 917 in the method 900, and the processing unit 1120 may be configured to perform steps 912 and 916 in the method 900.

When the apparatus 1100 is configured to perform the method 1000 in FIG. 10, the processing unit 1120 may be configured to perform step 1001 in the method 1000, and the transceiver unit 1110 may be configured to perform step 1002 in the method 1000.

It should be understood that a specific process in which the units perform the foregoing corresponding steps is described in detail in the foregoing method embodiments. For brevity, details are not described herein again.

In still another design, the apparatus 1100 is configured to perform an action performed by the authentication server of the DN in the embodiment shown in FIG. 6. The transceiver unit 1110 is configured to: receive an authentication and authorization message from a session management network element, where the authentication and authorization message is used by a data network to verify whether a terminal device is authorized to establish a session for accessing the data network. The processing unit 1120 is configured to: determine whether an authentication result of authentication and/or authorization by the data network on the terminal device exists; or determine that the data network is to perform secondary authentication for another session of the terminal device. The transceiver unit 1110 is further configured to send first indication information to the session management network element, where the first indication information indicates whether the authentication result of authentication and/or authorization by the data network on the terminal device exists, or the first indication information indicates the data network to perform secondary authentication for the another session of the terminal device.

In an example, when it is determined that the data network is to perform secondary authentication for the another session of the terminal device, the transceiver unit 1110 is further configured to: after secondary authentication performed by the data network for the another session of the terminal device ends, send an authentication result for the another session to the session management network element, where the authentication result for the another session indicates that the secondary authentication for the another session succeeds or fails.

In another example, the transceiver unit 1110 is specifically configured to: determine, based on stored information and one or more session attributes of the session, to send the authentication result for the another session to the session management network element after secondary authentication performed by the data network for the another session of the terminal device ends, where the stored information indicates to send the authentication result for the another session to the session management network element after secondary authentication performed by the data network for the another session of the terminal device ends.

In another example, the transceiver unit 1110 is further configured to: send second indication information to the session management network element, where the second indication information indicates whether to store information about the authentication result of authentication and/or authorization by the data network on the terminal device.

The apparatus 1100 may implement the steps or the procedures performed by the authentication server of the DN in the method 600 to the method 1000 according to embodiments of this disclosure. The apparatus 1100 may include units configured to perform the methods performed by the authentication server of the DN in the method 600 in FIG. 6 to the method 1000 in FIG. 10. In addition, the units in the apparatus 1100 and the foregoing other operations and/or functions are separately intended to implement corresponding procedures of the method 600 in FIG. 6 to the method 1000 in FIG. 10.

When the apparatus 1100 is configured to perform the method 600 in FIG. 6, the transceiver unit 1110 may be configured to perform step 610 in the method 600, and the processing unit 1120 may be configured to perform step 620, 631, or 632 in the method 600.

When the apparatus 1100 is configured to perform the method 700 in FIG. 7(1) and FIG. 7(2), the transceiver unit 1110 may be configured to perform steps 706A3 and 706B4 in the method 700, and the processing unit 1120 may be configured to perform steps 706A2 and 706B5 in the method 700.

When the apparatus 1100 is configured to perform the method 800 in FIG. 8A and FIG. 8B, the transceiver unit 1110 may be configured to perform steps 810, 812, 815, and 817 in the method 800, and the processing unit 1120 may be configured to perform steps 811 and 814 in the method 800.

When the apparatus 1100 is configured to perform the method 900 in FIG. 9A and FIG. 9B, the transceiver unit 1110 may be configured to perform step 923 in the method 900, and the processing unit 1120 may be configured to perform step 924 in the method 900.

When the apparatus 1100 is configured to perform the method 1000 in FIG. 10, the transceiver unit 1110 may be configured to perform step 1011 in the method 1000, and the processing unit 1120 may be configured to perform step 1012 in the method 1000.

It should be understood that a specific process in which the units perform the foregoing corresponding steps is described in detail in the foregoing method embodiments. For brevity, details are not described herein again.

The processing unit 1120 in the foregoing embodiment may be implemented by at least one processor or a processor-related circuit. The transceiver unit 1110 may be implemented by using a transceiver or a transceiver-related circuit. The storage unit may be implemented by at least one memory.

Figure 12:
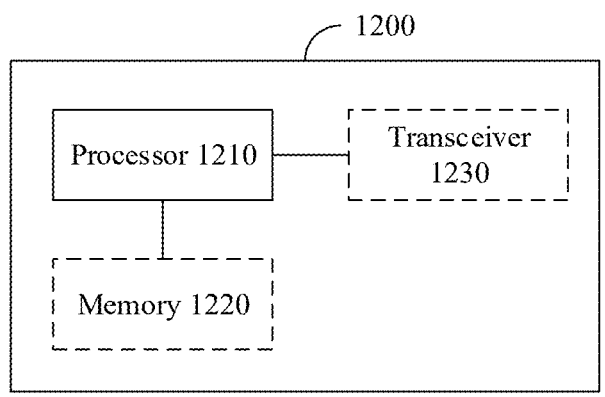
FIG. 12 is a schematic diagram of a structure of an authentication and authorization device according to an embodiment of this disclosure.

As shown in FIG. 12, an embodiment of this disclosure further provides an authentication and authorization device 1200. The device 1200 includes a processor 1210. The processor 1210 is coupled to a memory 1220. The memory 1220 is configured to store a computer program or instructions and/or data. The processor 1210 is configured to execute the computer program or the instructions and/or the data stored in the memory 1220, so that the methods in the foregoing method embodiments are performed.

Optionally, the device 1200 includes one or more processors 1210.

Optionally, as shown in FIG. 12, the device 1200 may further include a memory 1220.

Optionally, the device 1200 may include one or more memories 1220.

Optionally, the memory 1220 may be integrated with the processor 1210, or separately disposed.

Optionally, as shown in FIG. 12, the device 1200 may further include a transceiver 1230, and the transceiver 1230 is configured to receive and/or send a signal. For example, the processor 1210 is configured to control the transceiver 1230 to receive and/or send a signal.

In a solution, the device 1200 is configured to implement operations performed by the terminal device in the foregoing method embodiments.

For example, the processor 1210 is configured to implement processing-related operations performed by the terminal device in the foregoing method embodiments, and the transceiver 1230 is configured to implement receiving or sending related operations performed by the terminal device in the foregoing method embodiments.

In another solution, the device 1200 is configured to implement operations performed by the SMF in the foregoing method embodiments.

For example, the processor 1210 is configured to implement processing-related operations performed by the SMF in the foregoing method embodiments, and the transceiver 1230 is configured to implement receiving or sending related operations performed by the SMF in the foregoing method embodiments.

In still another solution, the device 1200 is configured to implement operations performed by the authentication server of the DN in the foregoing method embodiments.

For example, the processor 1210 is configured to implement processing-related operations performed by the authentication server of the DN in the foregoing method embodiments, and the transceiver 1230 is configured to implement receiving or sending related operations performed by the authentication server of the DN in the foregoing method embodiments.

It should be understood that a specific process in which the modules perform the foregoing corresponding steps is described in detail in the foregoing method embodiments. For brevity, details are not described herein again.

An embodiment of this disclosure further provides a processing apparatus, including a processor and an interface. The processor is configured to perform the method in any one of the foregoing method embodiments.

It should be understood that the processing apparatus may be one or more chips. For example, the processing apparatus may be a field programmable gate array (field programmable gate array, FPGA), an application-specific integrated circuit (application-specific integrated circuit, ASIC), a system on chip (system on chip, SoC), a central processor unit (central processor unit, CPU), a network processor (network processor, NP), a digital signal processor (digital signal processor, DSP), a micro controller unit (micro controller unit, MCU), a programmable logic device (programmable logic device, PLD), or another integrated chip.

An embodiment of this disclosure further provides a computer-readable storage medium. The computer-readable storage medium stores a computer program used to implement the method performed by the terminal device in the foregoing method embodiments.

For example, when a computer program is executed by a computer, the computer is enabled to implement the method performed by the terminal device in the foregoing method embodiments.

An embodiment of this disclosure further provides a computer-readable storage medium. The computer-readable storage medium stores computer instructions used to implement the method performed by the SMF in the foregoing method embodiments.

For example, when a computer program is executed by a computer, the computer is enabled to implement the method performed by the SMF in the foregoing method embodiments.

An embodiment of this disclosure further provides a computer-readable storage medium. The computer-readable storage medium stores computer instructions used to implement the method performed by the authentication server of the DN in the foregoing method embodiments.

For example, when a computer program is executed by a computer, the computer is enabled to implement the method performed by the authentication server of the DN in the foregoing method embodiments.

An embodiment of this disclosure further provides a computer program product including instructions. When the instructions are executed by a computer, the computer is enabled to implement the method performed by the terminal device, the method performed by the SMF, or the method performed by the authentication server of the DN in the foregoing method embodiments.

An embodiment of this disclosure further provides a communication system. The communication system includes the terminal device, the SMF, and the authentication server of the DN in the foregoing embodiments.

It may be clearly understood by a person skilled in the art that, for convenience and brief description, for explanations and beneficial effects of related content in any communication apparatus provided above, refer to the corresponding method embodiment provided above. Details are not described herein again.

A specific structure of an execution body of the method provided in embodiments of this disclosure is not specifically limited in embodiments of this disclosure, provided that a program that records code of the method provided in embodiments of this disclosure can be run to perform communication according to the method provided in embodiments of this disclosure. For example, the method provided in embodiments of this disclosure may be performed by the terminal device or the network device, or may be performed by a functional module that is in the terminal device or the network device and that can invoke and execute a program.

Aspects or features of this disclosure may be implemented as a method, an apparatus or a product that uses standard programming and/or engineering technologies. As used herein, the term "product" may cover a computer program that is accessible from any computer-readable device, carrier, or medium.

The computer-readable storage medium may be any usable medium accessible by a computer, or a data storage device, such as a server or a data center, integrating one or more usable media. The usable medium (or the computer-readable medium) may include, for example, but is not limited to, various media that can store program code such as a magnetic medium or a magnetic storage device (for example, a floppy disk, a hard disk (for example, a removable hard disk), or a magnetic tape), an optical medium (for example, an optical disc, a compact disc (compact disc, CD), or a digital versatile disc (digital versatile disc, DVD)), a smart card, and a flash memory device (for example, an erasable programmable read-only memory (erasable programmable read-only memory, EPROM), a card, a stick, or a key drive), or a semiconductor medium (for example, a solid-state disk (solid-state disk, SSD), a USB flash drive, a read-only memory (read-only memory, ROM), or a random access memory (random access memory, RAM)).

Various storage media described in this specification may represent one or more devices and/or other machine-readable media that are configured to store information. The term "machine-readable media" may include but is not limited to a radio channel and various other media that can store, include, and/or carry instructions and/or data.

It may be understood that the memory mentioned in the embodiments of this disclosure may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. As an example instead of a limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA, another programmable logic device, a discrete gate or a transistor logic device, or a discrete hardware component, the memory (storage module) may be integrated into the processor.

It should be further noted that the memory described in this specification is intended to include, but is not limited to, these memories and any other memory of a suitable type.

In the several embodiments provided in this disclosure, it should be understood that the disclosed apparatus and method may be implemented in other manners. For example, the foregoing apparatus embodiments are only examples. For example, division into the foregoing units is only logical function division, and may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The foregoing units described as separate parts may or may not be physically separate, and parts displayed as units may or may not be physical units, may be located in one position, or may be distributed on a plurality of network units. Some or all of the units may be selected based on actual requirements to implement the solutions provided in this disclosure.

In addition, function units in embodiments of this disclosure may be integrated into one unit, or each of the units may exist alone physically, or two or more units are integrated into one unit.

All or some of the foregoing embodiments may be implemented by using software, hardware, firmware, or any combination thereof.

When software is used to implement embodiments, all or some of embodiments may be implemented in a form of a computer program product. The computer program product includes one or more computer instructions. When the computer program instructions are loaded and executed on a computer, the procedures or functions according to embodiments of this disclosure are all or partially generated. The computer may be a general-purpose computer, a dedicated computer, a computer network, or other programmable apparatuses. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. For the computer-readable storage medium, refer to the foregoing descriptions.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims and this specification.

What is claimed is:

1. A method, comprising:
   receiving a first session establishment request message from a terminal device, wherein the first session establishment request message requests to establish a first session with a data network;
   determining whether a result of authentication and/or authorization by the data network on the terminal device exists; and
   when the result exists, skipping a secondary authentication procedure for the first session;
   wherein the determining whether the result of authentication and/or authorization by the data network on the terminal device exists comprises: when a data network name of the data network and a data network name in the result have different values but identify a same data network, determining that the result exists.

2. The method according to claim 1, wherein the result comprises authentication and authorization information, and the authentication and authorization information comprises one or more selected from the following:
   one or more data network identifiers, an identifier of an authentication network element of the data network, validity information, an index of a text authorized by the data network, a session-aggregate maximum bit rate authorized by the data network, an allowed media access control address, an allowed virtual local area network identifier, or information indicating to report session information.

3. The method according to claim 1, wherein the method further comprises:
   initiating the secondary authentication procedure for the first session or suspending the first session when no result exists.

4. The method according to claim 3, wherein
   after initiating the secondary authentication procedure for the first session, the method further comprises:
   suspending the first session based on first indication information sent by the terminal device or by an authentication network element of the data network, wherein
   the first indication information indicates that the data network is going to perform or is performing secondary authentication for a second session of the terminal device.

5. The method according to claim 3, wherein the initiating of the secondary authentication procedure for the first session or suspending the first session when no result exists comprises:
   when no result exists, determining whether the data network is going to perform or is performing secondary authentication for a second session of the terminal device; and
   when the data network is going to perform or is performing secondary authentication for the second session of the terminal device, suspending the first session; or
   when the data network is not going to perform or is not performing secondary authentication for the second session of the terminal device, initiating the secondary authentication procedure for the first session.

6. The method according to claim 5, wherein after suspending the first session, the method further comprises:
   obtaining a result of authentication and/or authorization by the data network for the second session of the terminal device, wherein the result for the second session indicates that secondary authentication for the second session succeeds or fails.

7. The method according to claim 6, wherein the method further comprises:
   when the result for the second session indicates that the secondary authentication for the second session succeeds, skipping the secondary authentication procedure for the first session, and continuing a subsequent session establishment procedure; or
   when the result for the second session indicates that the secondary authentication for the second session fails, rejecting establishment of the first session.

8. The method according to claim 3, wherein
   when the secondary authentication procedure for the first session is initiated, the method further comprises:
   after the secondary authentication procedure for the first session succeeds, determining, based on any one of the following: a session attribute of the first session, a local policy, or second indication information, whether to store a result for the first session from the secondary authentication procedure, wherein
   the second indication information is information that is from an authentication network element of the data network or from the terminal device and that indicates whether to store the result for the first session.

9. The method according to claim 1, wherein the determining whether a result of authentication and/or authorization by the data network on the terminal device exists comprises:
- determining whether the result locally exists;
- determining whether the result exists in a unified data management network element;
- determining, based on third indication information from the terminal device or from the authentication network element of the data network, whether the result exists; or
- determining whether the result exists in an authenticated dataset.

10. The method according to claim 9, wherein the determining whether the result exists in an authenticated dataset comprises:
- when the authenticated dataset comprises an identifier of the data network, determining that the result exists; or
- when the authenticated dataset does not comprise an identifier of the data network, determining that no result exists.

11. A method, comprising:
- sending a first session establishment request message to a session management network element, wherein the first session establishment request message requests to establish a first session with a data network;
- determining, in a process of performing secondary authentication for the first session of a terminal device with the data network, whether the data network is going to perform or is performing secondary authentication for a second session of the terminal device based on an authentication result in the secondary authentication of the first session; and
- when the data network is going to perform or is performing secondary authentication for the second session of the terminal device, sending first indication information to the first session management network element, wherein the first indication information indicates the data network is going to perform or is performing secondary authentication for the second session of the terminal device.

12. The method according to claim 11, wherein the determining, in a process of performing secondary authentication for the first session with the data network, whether the data network is going to perform or is performing secondary authentication for a second session of a terminal device comprises:
- after an authentication protocol request message from the session management network element is received, determining whether the data network is going to perform or is performing secondary authentication for the second session of the terminal device.

13. The method according to claim 11, wherein the method further comprises:
- after the secondary authentication performed by the data network for the second session of the terminal device ends, sending a result for the second session to the session management network element, wherein the result for the second session indicates that the secondary authentication for the second session succeeds or fails.

14. The method according to claim 13, wherein the method further comprises:
- based on stored information and one or more session attributes of the first session, sending the result for the second session to the session management network element after the secondary authentication performed by the data network for the second session of the terminal device ends.

15. The method according to claim 11, wherein the method further comprises:
- sending second indication information to the session management network element, wherein the second indication information indicates whether to store information of the result of authentication and/or authorization by the data network on the terminal device.

16. A method, comprising:
- receiving an authentication and authorization message from a session management network element, wherein the authentication and authorization message is used by a data network to verify whether a terminal device is authorized to establish a first session for accessing the data network;
- determining whether a result of authentication and/or authorization by the data network on the terminal device exists, or determining that the data network is going to perform or is performing secondary authentication for a second session of the terminal device; and
- sending first indication information to the session management network element, wherein the first indication information indicates whether the result of authentication and/or authorization by the data network on the terminal device exists, or the first indication information indicates the data network is going to perform or is performing secondary authentication for the second session of the terminal device;
- wherein the determining of whether the result of authentication and/or authorization by the data network on the terminal device exists comprises: when a data network name of the data network and a data network name in the result have different values but identify a same data network, determining that the result exists; and
- wherein the determining that the data network is going to perform or is performing secondary authentication for a second session of the terminal device is based on an authentication result in a secondary authentication for the first session of the terminal device.

17. The method according to claim 16, wherein when it is determined that the data network is going to perform or is performing secondary authentication for the second session of the terminal device, the method further comprises:
- after the secondary authentication performed by the data network for the second session of the terminal device, sending a result for the second session to the session management network element, wherein the result for the second session indicates that the secondary authentication for the second session succeeds or fails.

18. The method according to claim 16, wherein the method further comprises:
- sending second indication information to the session management network element, wherein the second indication information indicates whether to store information of the result of authentication and/or authorization by the data network on the terminal device.

19. A communication apparatus, comprising:
- one or more processing circuits; and
- one or more transceiver circuits;
- wherein the one or more processing circuits are configured to:
  - receive, via the one or more transceiver circuits, a first session establishment request message from a terminal device, wherein the first session establishment request message requests to establish a first session with a data network;

determine whether a result of authentication by the data network on the terminal device exists; and when the result exists, skip a secondary authentication procedure for the first session, and when no result exits, initiate the secondary authentication procedure for the first session or suspend the first session;

wherein the determining of whether the result of authentication and/or authorization by the data network on the terminal device exists comprises: when a data network name of the data network and a data network name in the result have different values but identify a same data network, determining that the result exists.

20. The communication apparatus of claim 19, wherein the initiating of the secondary authentication procedure for the first session or suspending the first session when no result exists comprises:

when no result exists, determining whether the data network is to perform secondary authentication for a second session of the terminal device; and when the data network is determined to perform secondary authentication for the second session of the terminal device, suspending the first session; or when the data network does not perform secondary authentication for the second session of the terminal device, initiating the secondary authentication procedure for the first session.

* * * * *